(12) United States Patent
Sugahara et al.

(10) Patent No.: US 12,264,494 B2
(45) Date of Patent: Apr. 1, 2025

(54) CONVEYING DEVICE

(71) Applicants: Mitsubishi Electric Corporation, Tokyo (JP); Tokyo Institute of Technology, Tokyo (JP)

(72) Inventors: Yusuke Sugahara, Tokyo (JP); Yukio Takeda, Tokyo (JP); Daisuke Matsuura, Tokyo (JP); Takahiro Ishii, Tokyo (JP); Takeshi Matsumoto, Tokyo (JP); Masayuki Kakio, Tokyo (JP); Daisuke Nakazawa, Tokyo (JP)

(73) Assignees: MITSUBISHI ELECTRIC CORPORATION, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 688 days.

(21) Appl. No.: 17/621,239

(22) PCT Filed: Aug. 27, 2019

(86) PCT No.: PCT/JP2019/033579
§ 371 (c)(1),
(2) Date: Dec. 21, 2021

(87) PCT Pub. No.: WO2021/038731
PCT Pub. Date: Mar. 4, 2021

(65) Prior Publication Data
US 2022/0364380 A1  Nov. 17, 2022

(51) Int. Cl.
*E04H 6/18*  (2006.01)
*B65G 1/04*  (2006.01)
(52) U.S. Cl.
CPC .............. *E04H 6/18* (2013.01); *B65G 1/0492* (2013.01)

(58) Field of Classification Search
CPC .... E04H 6/18; E04H 6/12; E04H 6/22; B65G 1/0492; B65G 1/04; B66B 9/02
See application file for complete search history.

(56) References Cited

U.S. PATENT DOCUMENTS 5,464,072 A  11/1995  Muller
2018/0201481 A1  7/2018  King

FOREIGN PATENT DOCUMENTS

CN  1087317 A  *  6/1994  ............... B66B 9/02
CN  107826945   *  3/2018
(Continued)

OTHER PUBLICATIONS

JP-H07232877 description with paragraph numbers (Year: 1995).*
(Continued)

*Primary Examiner* — Jacob S. Scott
*Assistant Examiner* — Erin Morris
(74) *Attorney, Agent, or Firm* — XSENSUS LLP

(57) ABSTRACT

There is provided a conveying device that can support a car weight with a mechanism lighter in weight. A driving device (6) of a conveying device that lifts and lowers a loading-weight support along a rail (3) includes a wheel unit (13) and a link (14). The wheel unit (13) drives to rotate a driving wheel (15) in contact with a guide surface (11) to lift and lower the loading-weight support. The link (14) includes a first joint (17) connected to the wheel unit (13) and a second joint (18) rotatably supported by the loading-weight support. The second joint (18) is arranged in a position further apart from the guide surface (11) than the first joint (17), and above the first joint (17). The link (14) is arranged such that a straight line connecting the first joint (17) and the second joint (18) is tilted smaller than 45 degrees.

14 Claims, 23 Drawing Sheets

(56) References Cited

FOREIGN PATENT DOCUMENTS

| | | | | |
|---|---|---|---|---|
| CN | 108290715 A | * | 7/2018 | ......... B66B 11/0206 |
| JP | 6-219667 A | | 8/1994 | |
| JP | H07232877 A | * | 9/1995 | |
| JP | 2009-51597 A | | 3/2009 | |
| JP | 2009-280313 A | | 12/2009 | |
| JP | 5555070 B2 | | 7/2014 | |
| JP | 2018-522794 A | | 8/2018 | |

OTHER PUBLICATIONS

CN108290715 description with paragraph numbers (Year: 2018).*
CN1087317 description with paragraph numbers (Year: 1994).*
Chinese Office Action dated Feb. 8, 2023 in the corresponding Chinese patent application No. 201980099534.5, 15pp.
International Search Report mailed on Oct. 21, 2019, received for PCT Application PCT/JP2019/033579, Filed on Aug. 27, 2019, 5 pages including English Translation.

* cited by examiner

CONVEYING DEVICE

CROSS-REFERENCE TO RELATED APPLICATION

The present application is based on PCT filing PCT/JP2019/033579, filed Aug. 27, 2019, the entire contents of which are incorporated herein by reference.

FIELD

The present invention relates to a conveying device.

BACKGROUND

PTL 1 discloses an example of a self-propelled elevator. A car of the elevator includes driving wheels driven to rotate by motors. The driving wheels are in contact with a rail. The car is supported by a frictional force generated between the driving wheels and the rail.

CITATION LIST

Patent Literature

[PTL 1] JP 2009-280313 A

SUMMARY

Technical Problem

An upper limit of the frictional force generated between the driving wheels and the rail is decided by force for pressing the driving wheels against the rail. Therefore, the driving wheels are pressed against the rail with sufficiently large force such that a frictional force that can support the car weight of the car is generated. In the elevator disclosed in PTL 1, the driving wheels are pressed against the rail by springs. Therefore, the car needs large springs for pressing the driving wheels against the rail with the sufficiently large force. Consequently, the car weight of the car increases.

The present invention has been devised in order to solve such a problem. An object of the present invention is to provide a conveying device that can support a car weight with a mechanism lighter in weight.

Solution to Problem

A conveying device according to the present invention includes: a loading-weight supporting section that supports a load of an object to be conveyed and moves up and down in a shaft to convey the object to be conveyed; and a first driving device that is provided in the loading-weight supporting section and lifts and lowers the loading-weight supporting section along a first rail extending in a lifting and lowering direction of the loading-weight supporting section in the shaft, wherein the first driving device includes: a first wheel unit that includes a first wheel in contact with a guide surface extending in a longitudinal direction of the first rail and drives to rotate the first wheel to lift and lower the loading-weight supporting section; and a first coupling section that includes a first connecting section connected to the first wheel unit and a second connecting section rotatably supported by the loading-weight supporting section and is arranged such that the second connecting section is arranged in a position further apart from the guide surface than the first connecting section, the second connecting section is arranged above the first connecting section, and a tilt angle from a horizontal plane of a straight line connecting the first connecting section and the second connecting section is smaller than 45 degrees.

Advantageous Effects of Invention

With the conveying device according to the present invention, a car weight can be supported by a mechanism lighter in weight.

DESCRIPTION OF EMBODIMENTS

Figure 1:
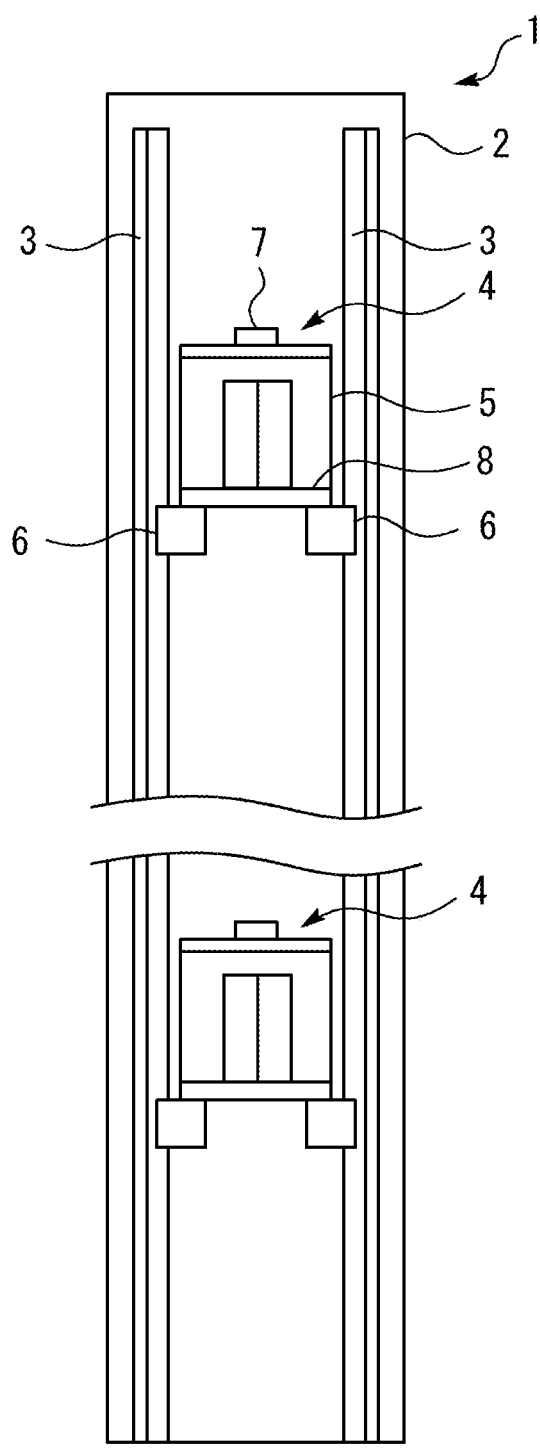
FIG. 1 A front view of a conveying device according to a first embodiment.

Modes for carrying out the present invention are explained with reference to the accompanying drawings. In the figures, the same or equivalent portions are denoted by the same reference numerals and signs and redundant explanation is simplified or omitted as appropriate.

First Embodiment

FIG. 1 is a front view of a conveying device according to a first embodiment.

The conveying device is a device that conveys an object to be conveyed in a lifting and lowering direction. The lifting and lowering direction is, for example, the vertical direction or an oblique direction tilted with respect to the vertical direction. The object to be conveyed is, for example, a person or an article. The conveying device is a self-propelled device. The conveying device is applied, for example, in an elevator, a stacker crane, a multistory parking space, or a multistory bicycle parking space. In FIG. 1, a self-propelled elevator 1 is shown as an example of the conveying device.

The elevator 1 is provided, for example, in a building. The building includes a plurality of floors. In the building, a shaft 2 extending across the plurality of floors is provided. In this example, the shaft 2 is a space extending in the vertical direction. In this example, the lifting and lowering direction is the vertical direction. Two rails 3 are provided in the shaft 2. The two rails 3 are arranged in parallel to each other along the lifting and lowering direction in the shaft 2. The two rails 3 are opposed to each other.

The elevator 1 includes one or more cars 4. The elevator 1 may include three or more cars 4 with respect to one shaft 2. In this example, the car 4 moves up and down in the shaft 2 with the left and right end portions of the car 4 guided by the rails 3.

In general, a self-propelled elevator does not need a rope for lifting and lowering a car in a shaft. Therefore, three or more cars can run in one shaft. In general, as a building in which an elevator is provided increases in height, a ratio of the area of shafts to the area of the building is larger. Therefore, it is effective, in reducing the area of the shafts, to cause a plurality of cars to run in one shaft. In general, as driving means for the self-propelled elevator, for example, a linear motor type, a rack and pinion type, or a wheel driving type is adopted. In this example, the driving means for the self-propelled elevator is the wheel driving type.

Each of the one or more cars 4 includes a car cabin 5, driving devices 6, and a control section 7.

The car cabin 5 includes, on the inside, a space for loading an object to be conveyed. The car cabin 5 includes a car platform 8. The car platform 8 is the lower surface of the car cabin 5. The car platform 8 supports the load of the object to be conveyed loaded in the car cabin 5. The car cabin 5 is an example of the loading-weight supporting section.

The driving devices 6 are devices that generate a driving force for lifting and lowering the car cabin 5. The driving devices 6 are provided in the car cabin 5. The driving devices 6 are arranged to be located in outer peripheral portions of the car cabin 5 when the car cabin 5 is projected onto the horizontal plane. In this example, the car 4 includes two driving devices 6. Each of the two driving devices 6 has the same configuration. One driving device 6 is provided at the left end portion of the lower surface of the car platform 8. The other driving device 6 is provided at the right end portion of the lower surface of the car platform 8. The driving device 6 on the left side grips the rail 3 on the left side. The driving device 6 on the right side grips the rail 3 on the right side. The driving devices 6 lift and lower the car cabin 5 with a frictional force between the driving devices 6 and the rails 3 gripped by the driving devices 6.

The control section 7 is a portion that controls a motion of the car 4. The control section 7 is arranged, for example, in an upper part of the car cabin 5. Alternatively, the control section 7 may be arranged in a lower part of the car 4 or other places. The control section 7 may be divided into a plurality of portions and arranged.

Figure 2:
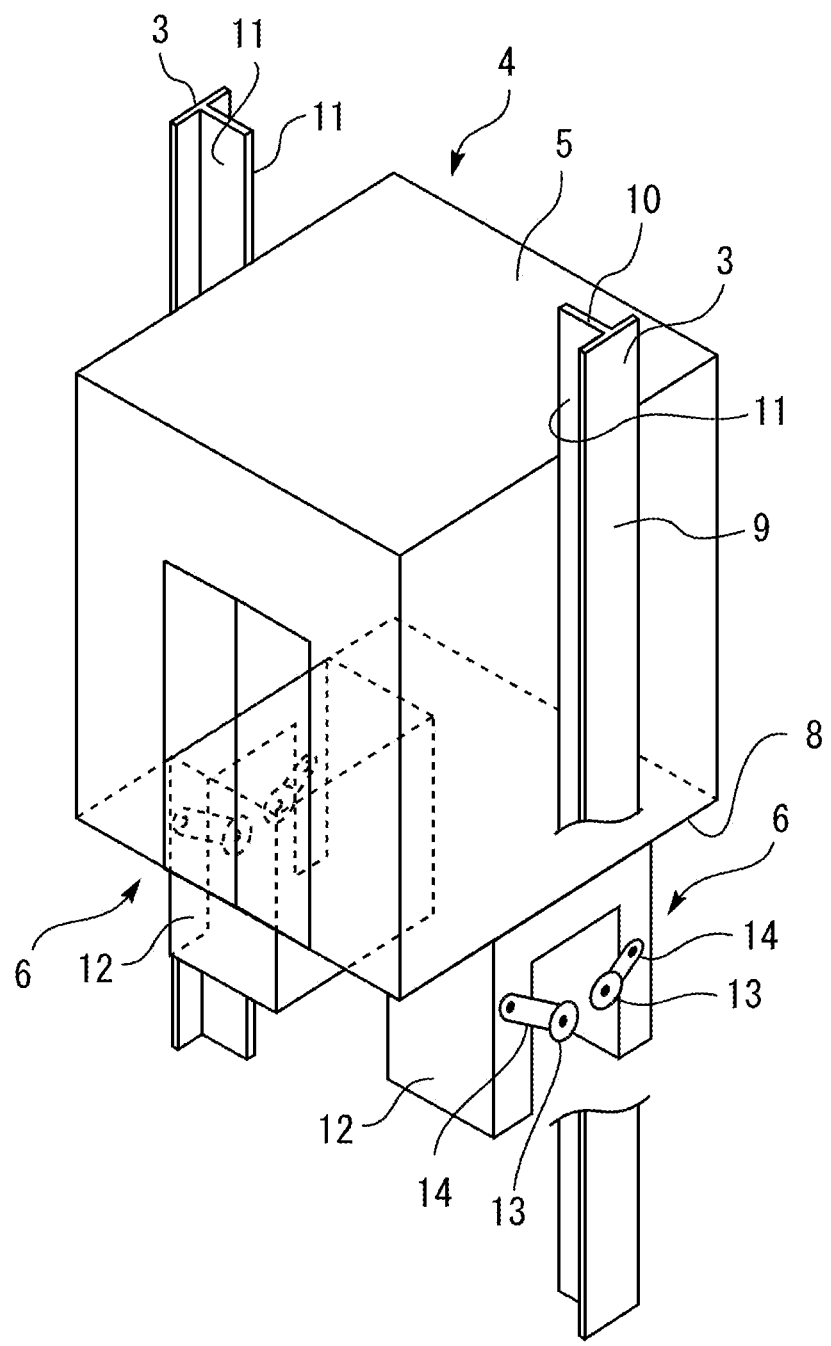
FIG. 2 A perspective view of the conveying device according to the first embodiment.

FIG. 2 is a perspective view of the conveying device according to the first embodiment.

In this example, the shape of the horizontal cross section of the rail 3 is a T shape. The rail 3 includes a base plate 9 and a guide plate 10. The base plate 9 is a portion on the far side from the car 4. In this example, the base plate 9 of the rail 3 on the left side is a plate-like portion on the left side. The base plate 9 of the rail 3 on the right side is a plate-like portion on the right side. The guide plate 10 is a panel perpendicular to the base plate 9. The guide plate 10 is a plate-like portion arranged from the base plate 9 to the side of the car 4. The guide plate 10 includes a guide surface 11. The guide surface 11 is at least one of the front surface or the back face of the guide plate 10. The guide surface 11 extends in the longitudinal direction of the rail 3. The longitudinal direction of the rail 3 is the lifting and lowering direction of the car 4.

Figure 3:
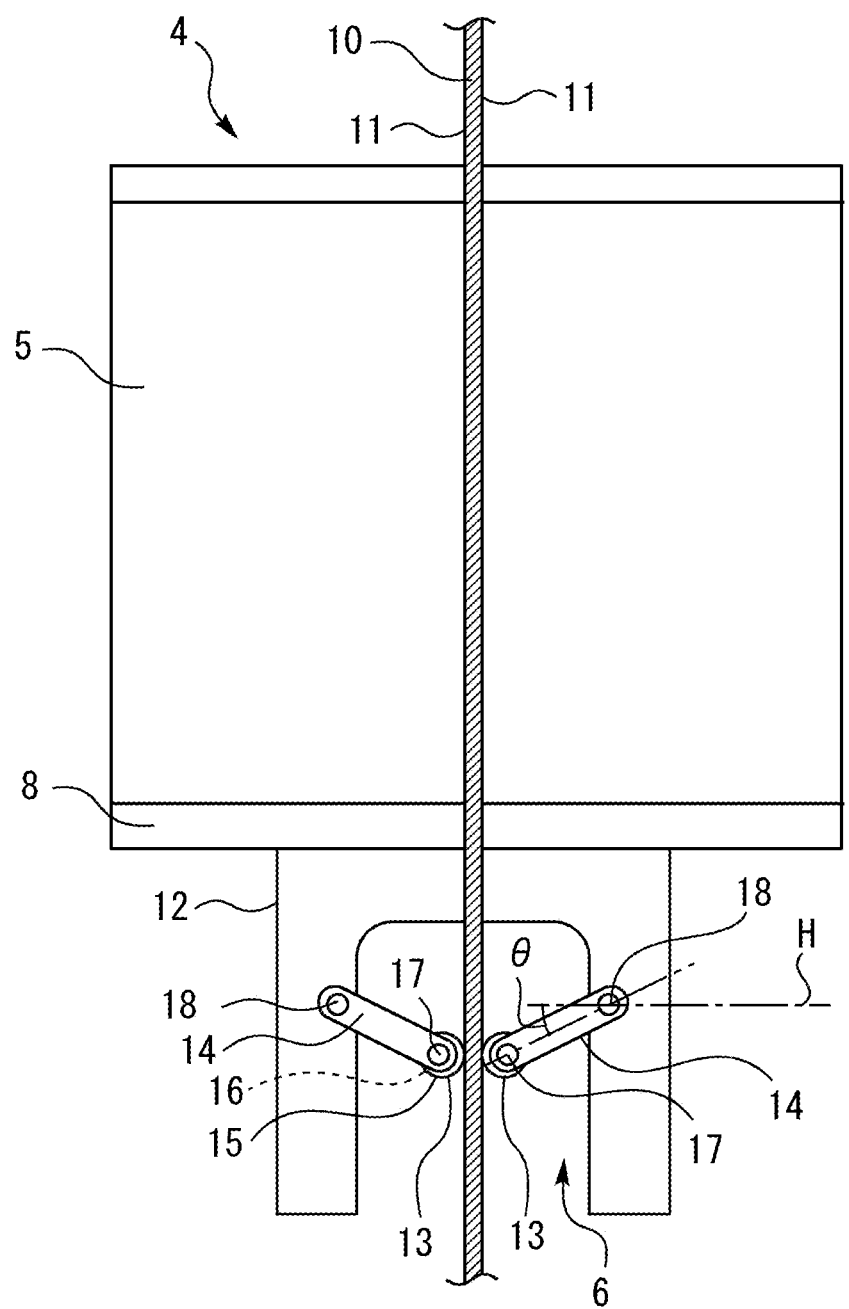
FIG. 3 A side view of the conveying device according to the first embodiment.

FIG. 3 is a side view of the conveying device according to the first embodiment. The car cabin 5 includes a base 12. The base 12 is arranged in a lower part of the car platform 8. The base 12 may be separably attached to the car platform 8 by, for example, bolts and nuts. Alternatively, the base 12 may be integral with the car platform 8. In this example, the car cabin 5 includes a pair of bases 12 at the respective left and right end portions of the car platform 8.

The driving device 6 generates a pressing force for the rail 3 using the car weight of the car 4. The driving device 6 includes a wheel unit 13 and a link for self-boosting 14. A set of the wheel unit 13 and the link for self-boosting 14 is arranged on one side with respect to the guide plate 10 of the rail 3. In this example, the driving device 6 includes one set of the wheel unit 13 and the link for self-boosting 14 on each of both sides of the guide plate 10 of the rail 3.

The wheel unit 13 includes a driving wheel 15 and a driving section. The driving wheel 15 is in contact with the guide surface 11 of the rail 3. The driving section is a portion that drives to rotate the driving wheel 15. The driving section is, for example, a motor 16. The driving section drives to rotate the driving wheel 15 to thereby generate, with a frictional force between the driving wheel 15 and the guide surface 11, a driving force for lifting and lowering the car cabin 5.

The link for self-boosting 14 is, for example, a bar-like or plate-like member. The link for self-boosting 14 includes a first connecting section 17 and a second connecting section 18. The first connecting section 17 is arranged, for example, at one end of the link for self-boosting 14. The second connecting section 18 is arranged, for example, at the other end of the link for self-boosting 14. The first connecting section 17 is a portion connected to the wheel unit 13. In this example, the first connecting section 17 is directly connected to a rotating shaft of the driving wheel 15. The second connecting section 18 is connected to the base 12. The second connecting section 18 is rotatably supported by the base 12. The second connecting section 18 is arranged in a position further apart from the guide surface 11 than the first connecting section 17. The second connecting section 18 is arranged above the first connecting section 17. A straight line connecting the first connecting section 17 and the second connecting section 18 forms a tilt angle θ between the straight line and a horizontal plane H.

In this example, one of the sets of the wheel unit 13 and the link for self-boosting 14 is arranged symmetrically to the other set across the rail 3. The driving device 6 grips the guide plate 10 of the rail 3 with two driving wheels 15.

A pressing force F acting when the driving wheel 15 is perpendicularly pressed against the guide surface 11 is represented by the following Expression (1). In Expression (1), M represents the car weight of the car 4, g represents gravitational acceleration, and N represents the number of wheels of the driving devices 6 that come into contact with the guide surface 11 and cause the pressing force F to act in the entire car 4.

[Math. 1]
$$F = \frac{Mg}{N \tan \theta}. \tag{1}$$

From Expression (1), when the tilt angle θ of the link for self-boosting 14 is 05.45°, the pressing force F is equal to or larger than the car weight M of the car 4. At this time, the link for self-boosting 14 acts as a boosting mechanism.

A coefficient of friction between the rail 3 and the driving wheel 15 is represented as μ. At this time, a maximum frictional force μNF generated between the driving device 6 and the rail 3 needs to be equal to or larger than magnitude Mg of the gravity by the car weight of the car 4 in order to support the car weight of the car 4 with a frictional force. From this condition, a maximum angle $\theta_{max}$ allowed as the tilt angle θ of the link for self-boosting 14 is represented by the following Expression (2).

Math. 2
$$\theta_{max} = \tan^{-1} \mu. \tag{2}$$

That is, if the tilt angle θ of the link for self-boosting 14 satisfies $\theta \leq \theta_{max}$, the pressing force F sufficiently large with respect to the car weight of the car 4 is secured.

Figure 4:
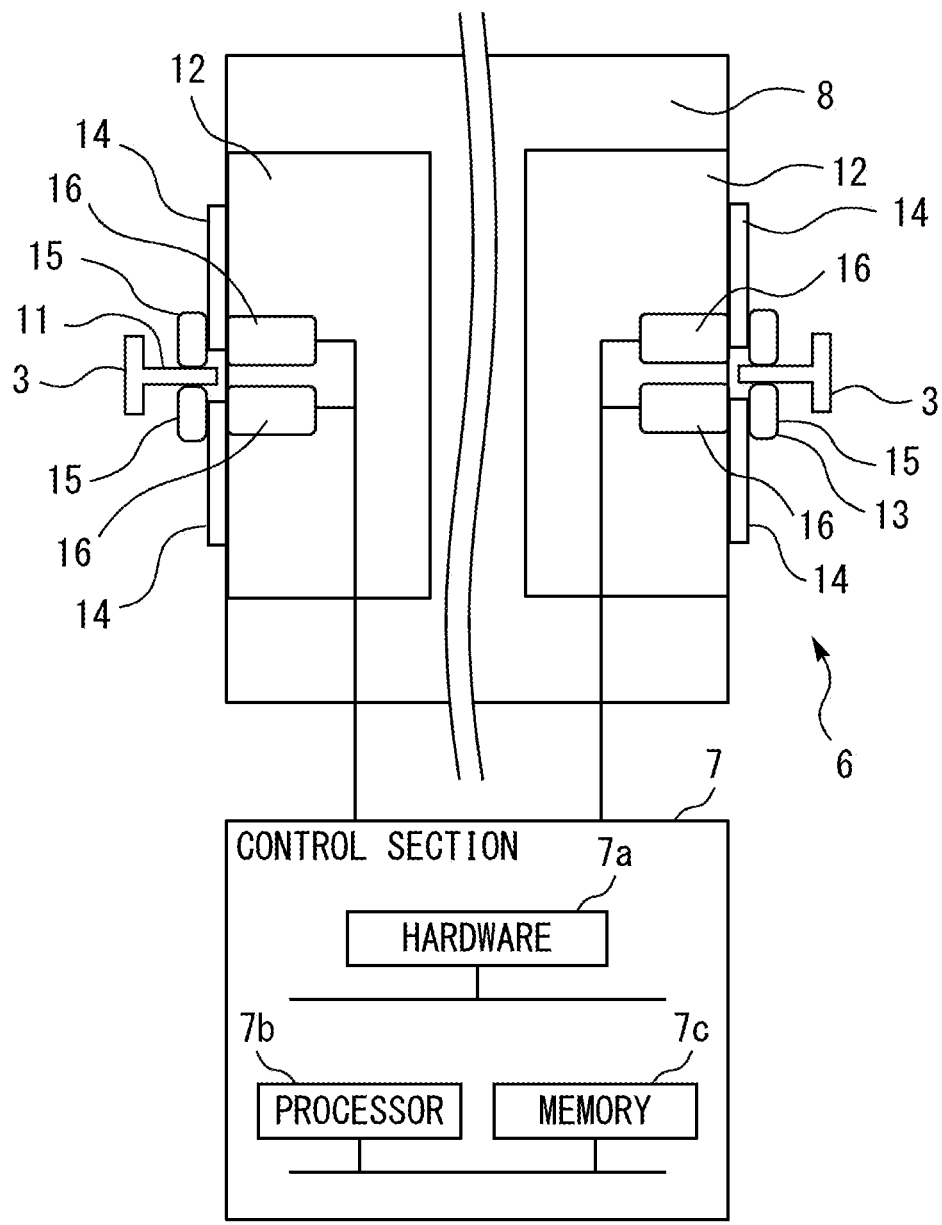
FIG. 4 A bottom view of the conveying device according to the first embodiment.

FIG. 4 is a bottom view of the conveying device according to the first embodiment.

In this example, a rotating shaft of the motor 16 is directly coupled to the rotating shaft of the driving wheel 15.

Subsequently, an example of a motion of the elevator 1 is explained.

In the self-propelled elevator 1 by the wheel driving type, the car 4 is not supported by a rope. Therefore, the car 4 is supported by a frictional force between the rail 3 and the driving wheel 15 that is in contact with the rail 3. A slip between the rail 3 and the driving wheel 15 is reduced by the frictional force between the rail 3 and the driving wheel 15. An upper limit of the frictional force is given by a product of the pressing force F for pressing the driving wheel 15 against the rail 3 and the coefficient of friction μ. Therefore, as the pressing force F increases, a stronger frictional force can be generated.

When the car 4 is standing still in the shaft 2, a load by the car weight is applied to the car 4. The driving wheel 15 of the driving device 6 is pressed against the rail 3 by the pressing force F. In this example, the two driving wheels 15 are pressed from both the side of the rail 3 by the pressing force F. Consequently, movement in the horizontal direction of the car 4 is suppressed. The link for self-boosting 14 functions as the boosting mechanism that makes use of the car weight of the car 4, whereby the pressing force F acts as force sufficiently large for supporting the car weight of the car 4 with the frictional force between the driving wheel 15 and the rail 3. In this way, the car 4 is supported in the shaft 2 by the frictional force between the driving wheel 15 and the rail 3.

An object to be conveyed is loaded in the car cabin 5, for example, as explained below. When the object to be conveyed is a passenger, the passenger rides in the car cabin 5. When the object to be conveyed is an article, the article is carried into the car cabin 5 by a worker or the like who performs conveyance function. The car cabin 5 supports the load of the loaded object to be conveyed. At this time, a load by the car weight of the car 4 and the weight of the object to be conveyed is applied to the car 4. The link for self-boosting 14 functions as the boosting mechanism, whereby the pressing force F generated by the driving device 6 increases according to an increase in weight by the object to be conveyed. In this way, the pressing force F follows fluctuation in the load supported by the car 4.

The driving section of the driving device 6 generates a driving force based on a control signal output from the control section 7, whereby the driving wheel 15 rotates while coming into contact with the guide surface 11 of the rail 3. At this time, a slip between the driving wheel 15 and the rail 3 is reduced by a frictional force between the driving wheel 15 and the rail 3. Consequently, the car 4 moves up and down in the shaft 2 along the rail 3. The car 4 moves up and down, whereby the object to be conveyed loaded in the car cabin 5 is conveyed.

Subsequently, an example of a hardware configuration of the control section 7 is explained with reference to FIG. 4.

In FIG. 4, a hardware configuration of a main part of the control section 7 is shown.

Functions of the control section 7 can be realized by a processing circuit. The processing circuit includes at least one processor 7*b* and at least one memory 7*c*. The processing circuit may include at least one kind of dedicated hardware 7*a* together with the processor 7*b* and the memory 7*c* or as a substitute for the processor 7*b* and the memory 7*c*.

When the processing circuit includes the processor 7*b* and the memory 7*c*, the functions of the control section 7 are realized by software, firmware, or a combination of the software and the firmware. At least one of the software or the firmware is described as a program. The program is stored in the memory 7*c*. The processor 7*b* reads out and executes the program stored in the memory 7c to thereby realize the functions of the control section 7.

The processor 7b is referred to as a CPU (Central Processing Unit), a processing device, an arithmetic device, a microprocessor, a microcomputer, or a DSP as well. The memory 7c is configured by a nonvolatile or volatile semiconductor memory or the like such as a RAM, a ROM, a flash memory, an EPROM, or an EEPROM.

When the processing circuit includes the dedicated hardware 7a, the processing circuit is implemented by, for example, a single circuit, a composite circuit, a programmed processor, a parallel-programmed processor, an ASIC, an FPGA, or a combination of the foregoing.

The functions of the control section 7 can be respectively realized by processing circuits. Alternatively, the functions of the control section 7 can be collectively realized by a processing circuit. A part of the functions of the control section 7 may be realized by the dedicated hardware 7a and the other part of the functions may be realized by software or firmware. In this way, the processing circuit realizes the functions of the control section 7 with hardware, software, firmware, or a combination of the software and the firmware.

As explained above, the conveying device according to the first embodiment includes the loading-weight supporting section and the first driving device. The loading-weight supporting section supports the load of the object to be conveyed and lifts and lowers the shaft 2 to convey the object to be conveyed. The first driving device is provided in the loading-weight supporting section. The first driving device lifts and lowers the loading-weight supporting section along a first rail. The first rail extends in a lifting and lowering direction of the loading-weight supporting section in the shaft 2. The first driving device includes a first wheel unit and a first coupling section. The first wheel unit includes a first wheel. The first wheel is in contact with the guide surface 11. The guide surface 11 is a surface of the first rail extending in the longitudinal direction of the first rail. The first wheel unit rotates to drive the first wheel to lift and lower the loading-weight supporting section. The first coupling section includes the first connecting section 17 and the second connecting section 18. The first connecting section 17 is connected to the first wheel unit. The second connecting section 18 is rotatably supported by the loading-weight supporting section. The second connecting section 18 is arranged in a position further apart from the guide surface 11 than the first connecting section 17. The second connecting section 18 is arranged above the first connecting section 17. The first coupling section is arranged such that the tilt angle 9 from the horizontal plane of the straight line connecting the first connecting section 17 and the second connecting section 18 is smaller than 45 degrees.

At least one of the two rails 3 is an example of the first rail. The driving device 6 that grips the first rail is an example of the first driving device. The wheel unit 13 of the first driving device is an example of the first wheel unit. The driving wheel 15 of the first wheel unit is an example of the first wheel. The link for self-boosting 14 of the first driving device is an example of the first coupling section.

Consequently, by making use of the car weight of the car 4, a large pressing force F applied to the rail 3 can be realized by a simple mechanism. The pressing force F follows, with a mechanical mechanism, a load fluctuating according to the weight of the loaded object to be conveyed. Therefore, the elevator 1 does not need an actuator or the like that adjusts the pressing force F according to weight supported by the car 4. The elevator 1 does not need a heavy device such as a hydraulic actuator or a large spring for causing a pressing force assuming a possible maximum load to continue to act. Therefore, the driving device 6 can support the car weight of the car 4 with a mechanism lighter in weight. That is, it is possible suppress a situation which the mass of the car 4 is increased by providing a heavy device in order to generate a large pressing force and a larger pressing force is necessary. Since the mass of the car 4 is suppressed, energy requirement for conveyance is suppressed. Since the pressing force F follows the load, force more than necessary does not continue to act between the rail 3 and the driving wheel 15. Therefore, the life of the rail 3 or the driving wheel 15 is less easily reduced. The link for self-boosting 14 has a simple configuration for coupling the first connecting section 17 and the second connecting section 18. Therefore, the driving device 6 is easily reduced in size. The driving device 6 less easily causes backlash and less easily induces vibration.

The first connecting section is connected to a rotating shaft of the first wheel.

Consequently, the configuration of the driving device 6 is further simplified. Therefore, it is possible to further suppress an increase in the weight of the car 4.

The first driving device includes a second wheel unit and a second coupling section. The second wheel unit is arranged symmetrically to the first wheel unit across the first rail. The second wheel unit includes a second wheel. The second wheel is in contact with the rear side of a position of the first rail where the first wheel is in contact. The second coupling section is connected to the second wheel unit. The second coupling section is rotatably supported by the loading-weight supporting section. The second coupling section is arranged symmetrically to the first coupling section across the first rail.

One wheel unit 13 of the first driving device is an example of the first wheel unit. The other wheel unit 13 of the first driving device is an example of the second wheel unit. The driving wheel 15 of the second wheel unit is an example of the second wheel. The link for self-boosting 14 connected to the first wheel unit is an example of the first coupling section. The link for self-boosting 14 connected to the second wheel unit is an example of the second coupling section.

The second wheel is arranged on the rear side of a position where the first wheel is in contact with the guide plate 10. Consequently, pressing forces of the first wheel and the second wheel cancel each other. Consequently, bending deformation is suppressed from occurring in the rail 3. The second wheel functions as a restraining wheel that suppresses the first wheel unit and the first coupling section from moving in a direction away from the guide surface 11. Consequently, the first wheel is more stably in contact with the guide surface 11. Therefore, the running of the car 4 becomes more stable.

Note that the rails 3 may not be arranged on both the left and right side of the car 4. The rails 3 may be arranged, for example, on the back face side of the car 4. The back face of the car 4 is a surface on the depth side of the shaft 2 or the opposite side of a doorway into the car cabin 5. In the shaft 2, only one rail 3 of the elevator 1 may be provided. Alternatively, in the shaft 2, three or more rails 3 of the elevator 1 may be provided.

The driving device 6 may be arranged in any position from the lower end portion of the car cabin 5 to the upper end portion of the car cabin 5.

The driving section may be fixed and provided in the car cabin 5 or the link for self-boosting 14. At this time, the driving section may transmit a driving force to the driving wheel 15 with a belt or a chain and a gear or a pulley, and the like. The driving section may be, for example, an in-wheel motor arranged on the inside of the driving wheel 15.

The car 4 may include, for example, an emergency stop device, a car brake, and the like not shown in FIG. 4. The emergency stop device is a device that operates when the car 4 is in free fall and stops the car 4 by force. The car brake is a brake device that operates during rising and falling or during a stop of the car 4.

Subsequently, one modification of the first embodiment is explained with reference to FIG. 5.

Figure 5:
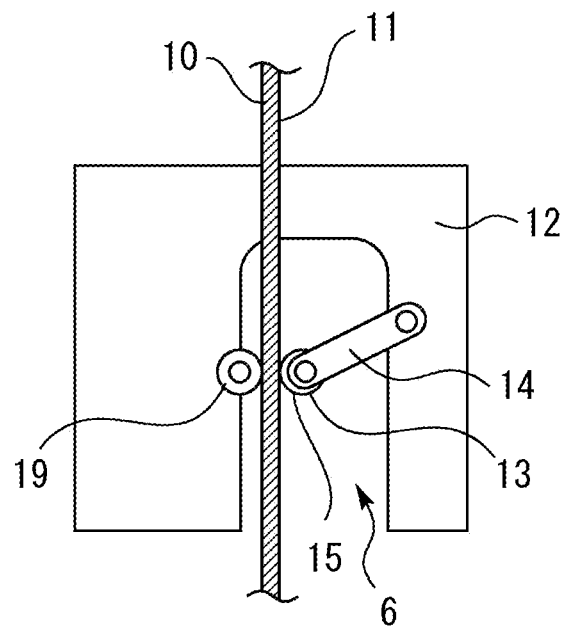
FIG. 5 A side view of a driving device according to a first modification of the first embodiment.

FIG. 5 is a side view of a driving device according to a first modification of the first embodiment.

The driving device 6 includes a counter wheel 19.

The counter wheel 19 is rotatably provided in the base 12. The counter wheel 19 is arranged on the opposite side of the guide plate 10 of the rail 3 with respect to the wheel unit 13. The counter wheel 19 is in contact with the rear side of a position of the rail 3 where the driving wheel 15 is in contact.

In this way, the driving device 6 grips the guide plate 10 of the rail 3 from both sides with the driving wheel 15 and the counter wheel 19. Consequently, movement in the horizontal direction of the car 4 is suppressed. That is, the counter wheel 19 functions as a restraining wheel that suppresses the first wheel unit and the first coupling section from moving in the direction away from the guide surface 11. The link for self-boosting 14 functions as a boosting mechanism making use of the car weight of the car 4, whereby the pressing force F acts as force sufficiently large for supporting the car weight of the car 4 with the frictional force between the driving wheel 15 and the rail 3. With the configuration of this modification, it is possible to obtain a self-boosting effect with a simpler configuration than the configuration shown in FIG. 3.

Subsequently, another modification of the first embodiment is explained with reference to FIG. 6.

Figure 6:
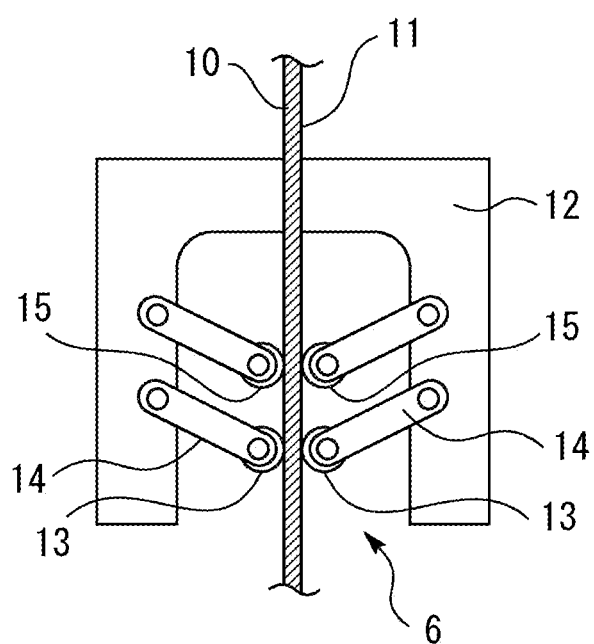
FIG. 6 A side view of a driving device according to a second modification of the first embodiment.

FIG. 6 is a side view of a driving device according to a second modification of the first embodiment.

In this example, the driving device 6 includes two sets of the wheel unit 13 and the link for self-boosting 14 on each of both sides of the guide plate 10 of the rail 3. The sets of the wheel unit 13 and the link for self-boosting 14 are symmetrically arranged with respect to the guide plate 10 of the rail 3.

In general, an acceptable value is decided for a surface pressure of a wheel. Therefore, it is necessary to adopt, for example, a large wheel that can allow a larger surface pressure as a pressing force that the wheel causes to act increases. With the configuration of this modification, a pressing force per one driving wheel 15 is reduced. Therefore, a small wheel can be adopted as the driving wheel 15. Consequently, even if the number of driving wheels 15 increases, total mass of the driving device 6 can be reduced. Therefore, it is sometimes possible to further reduce energy requirement for conveyance.

Note that the driving device 6 may include three or more sets of the wheel unit 13 and the link for self-boosting 14 on both sides with respect to the guide plate 10 of the rail 3.

In each of embodiments explained below, differences from examples disclosed in the other embodiments are explained particularly in detail. About characteristics not explained in each of the embodiments, any characteristics in the examples disclosed in the other embodiments may be adopted.

Second Embodiment

Figure 7:
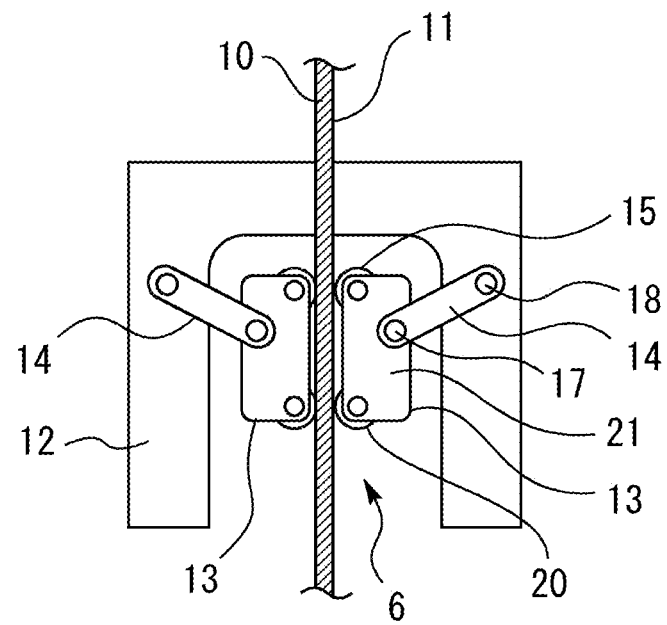
FIG. 7 A side view of a driving device according to a second embodiment.

FIG. 7 is a side view of a driving device according to a second embodiment.

The wheel unit 13 includes a sub-wheel 20 and a wheel coupling section 21.

The sub-wheel 20 is arranged side by side with the driving wheel 15 in the lifting and lowering direction of the car 4. The sub-wheel 20 is in contact with the guide surface 11 on the same side as the driving wheel 15 with respect to the guide plate 10. In this example, the sub-wheel 20 has the same configuration as the driving wheel 15. The sub-wheel 20 may be driven to rotate by the driving section. The sub-wheel 20 may be driven to rotate independently from the driving wheel 15.

The wheel coupling section 21 rotatably supports each of the driving wheel 15 and the sub-wheel 20. In this example, the wheel coupling section 21 supports the driving wheel 15 at the upper end portion. The wheel coupling section 21 supports the sub-wheel 20 at the lower end portion.

The first connecting section 17 of the link for self-boosting 14 is rotatably connected to the wheel coupling section 21. In this example, the first connecting section 17 is connected to the end portion of the wheel coupling section 21 on the far side from the guide surface 11. The first connecting section 17 is connected between the driving wheel 15 and the sub-wheel 20 in the lifting and lowering direction.

Subsequently, an example of a motion of the driving device 6 is explained with reference to FIG. 8.

Figure 8:
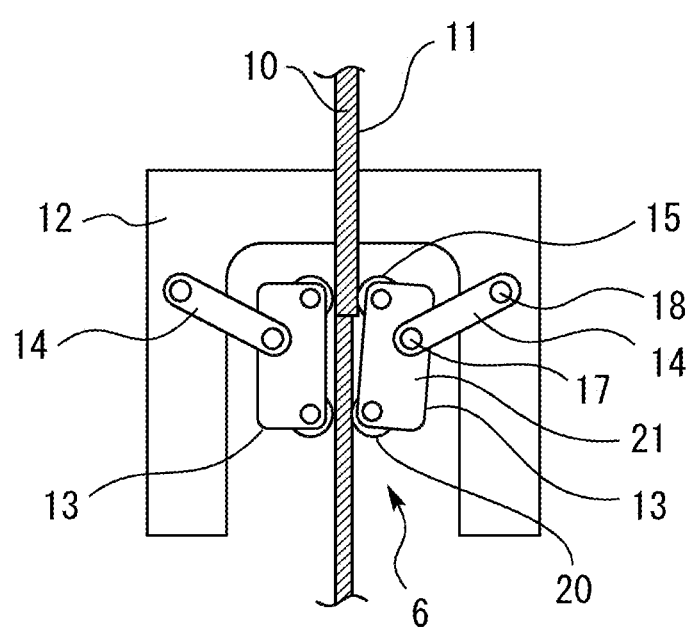
FIG. 8 A side view of the driving device according to the second embodiment.

FIG. 8 is a side view of the driving device according to the second embodiment.

The driving device 6 drives to rotate the driving wheel 15 with the driving section to thereby lift and lower the car 4 along the rail 3.

A bend sometimes occurs in the rail 3. A step difference sometimes occurs in a joint of rail 3.

When the wheel unit 13 comes to the step difference or the like on the rail 3, the driving wheel 15 or the sub-wheel 20 run onto the step difference. At this time, the wheel coupling section 21 rotates with the first connecting section 17 as a pivot point. Consequently, while both of the driving wheel 15 and the sub-wheel 20 are in contact with the guide surface 11 of the rail 3, the wheel unit 13 can climb over a step difference or the like on the guide surface 11. Since the link for self-boosting 14 functions as the boosting mechanism to transmit force to the wheel coupling section 21, a pressing force between the driving wheel 15 and the sub-wheel 20 is averaged. In this way, the wheel coupling section 21 acts as a pressing force averaging link.

As explained above, the first wheel unit of the conveying device according to the second embodiment includes the sub-wheel 20 and the wheel coupling section 21. The sub-wheel 20 is arranged side by side with the first wheel in the lifting and lowering direction. The sub-wheel 20 is in contact with the guide surface 11 on the same side as the first wheel. The wheel coupling section 21 rotatably supports the first wheel and the sub-wheel 20. The wheel coupling section 21 is rotatably connected to the first connecting section 17.

Consequently, even when a step difference or the like occurs on the guide surface 11 of the rail 3, a pressing force by the driving wheel 15 or the like is averaged. Therefore, it is possible to suppress a trouble such as wear or fatigue fracture from occurring early, because of a bias of pressing forces among a plurality of wheels in contact with the rail 3, in wheels on which a large pressing force is caused to act.

The wheel unit 13 is prevented by the wheel coupling section 21 from being easily snapped by the step difference or the like on the guide surface 11. The wheel unit 13 is prevented by the wheel coupling section 21 from easily receiving a large shock from the step difference or the like on the guide surface 11. Therefore, during the lifting and lowering of the car 4, a sudden change less easily occurs in a frictional force between the driving wheel 15 and the rail 3. Consequently, instability of the lifting and lowering of the car 4 due to a slip or the like of the driving wheel 15 is suppressed. Each of the wheel unit 13 is in contact with the guide surface 11 by two wheels, that is, the driving wheel 15 and the sub-wheel 20. Therefore, even when the wheel coupling section 21 is tilted by the step difference or the like on the guide surface 11, the number of wheels in contact with the guide surface 11 does not change from two. Therefore, a pressing force between the wheels and the guide surface 11 less easily fluctuates. Therefore, the lifting and lowering of the car 4 is further stabilized. When torque for climbing over the step difference is insufficient with one wheel of the driving wheel 15 and the sub-wheel 20, the wheel unit 13 easily climbs over the step difference by being pushed from the back by a driving force generated by the other wheel.

Note that the wheel coupling section 21 may support the driving wheel 15 at the lower end portion. At this time, the wheel coupling section 21 supports the sub-wheel 20, for example, at the upper end portion.

Subsequently, one modification of the second embodiment is explained with reference to FIG. 9.

Figure 9:
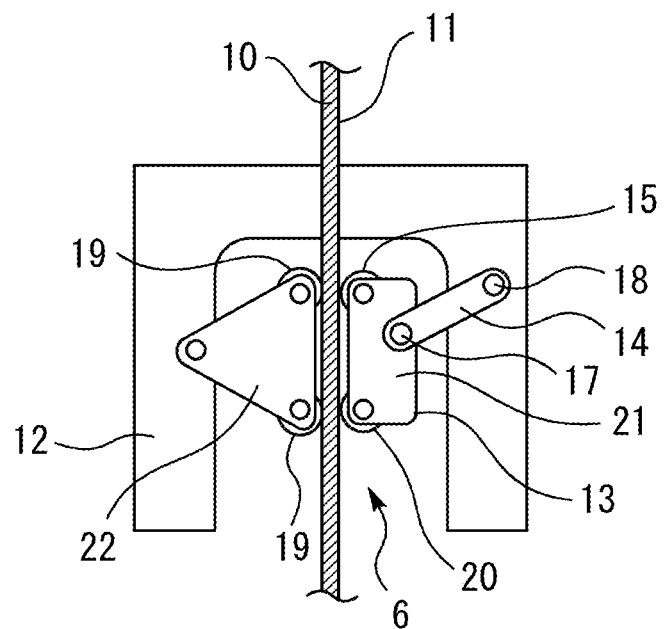
FIG. 9 A side view of a driving device according to a first modification of the second embodiment.

FIG. 9 is a side view of a driving device according to a first modification of the second embodiment.

The driving device 6 includes two counter wheels 19 and a counter-wheel coupling section 22.

Each of the two counter wheels 19 is arranged on the opposite side of the guide plate 10 of the rail 3 with respect to the wheel unit 13. One counter wheel 19 is in contact with the rear side of a position of the rail 3 where the driving wheel 15 is in contact. The other counter wheel 19 is in contact with the rear side of a position of the rail 3 where the sub-wheel 20 is in contact.

The counter-wheel coupling section 22 is an integral link member having, for example, a triangular shape, a T shape, or a Y shape. The counter-wheel coupling section 22 is rotatably supported by the base 12. The counter-wheel coupling section 22 rotatably supports each of the two counter wheels 19.

In this way, the driving device 6 grips the guide plate 10 of the rail 3 from both sides with the driving wheel 15 and the sub-wheel 20 and the two counter wheels 19. The two counter wheels 19 can climb over a step difference or the like on the guide surface 11 with the counter-wheel coupling section 22 in the same manner as the driving wheel 15 and the sub-wheel 20. With the configuration of this modification, it is possible to obtain effects of dispersion and averaging of a pressing force with a simpler configuration than the configuration shown in FIG. 7.

Subsequently, another modification of the second embodiment is explained with reference to FIG. 10.

Figure 10:
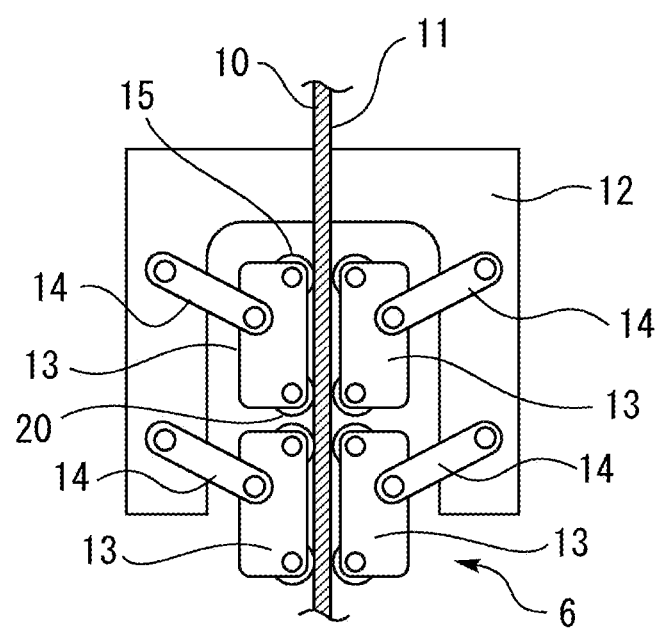
FIG. 10 A side view of a driving device according to a second modification of the second embodiment.

FIG. 10 is a side view of a driving device according to a second modification of the second embodiment.

In this example, the driving device 6 includes two sets of the wheel unit 13 including the wheel coupling section 21 and the link for self-boosting 14 on each of both sides with respect to the guide plate 10 of the rail 3. The sets of the wheel unit 13 and the link for self-boosting 14 are symmetrically arranged with respect to the guide plate 10 of the rail 3. Consequently, since more wheels are in contact with the guide surface 11 of the rail 3 than in the configuration shown in FIG. 7, pressing forces are further dispersed. Therefore, a pressing force per one wheel is further reduced. Note that the driving device 6 may include three or more sets of the wheel unit 13 and the link for self-boosting 14 on each of both the sides with respect to the guide plate 10 of the rail 3.

Subsequently, another modification of the second embodiment is explained with reference to FIG. 11.

Figure 11:
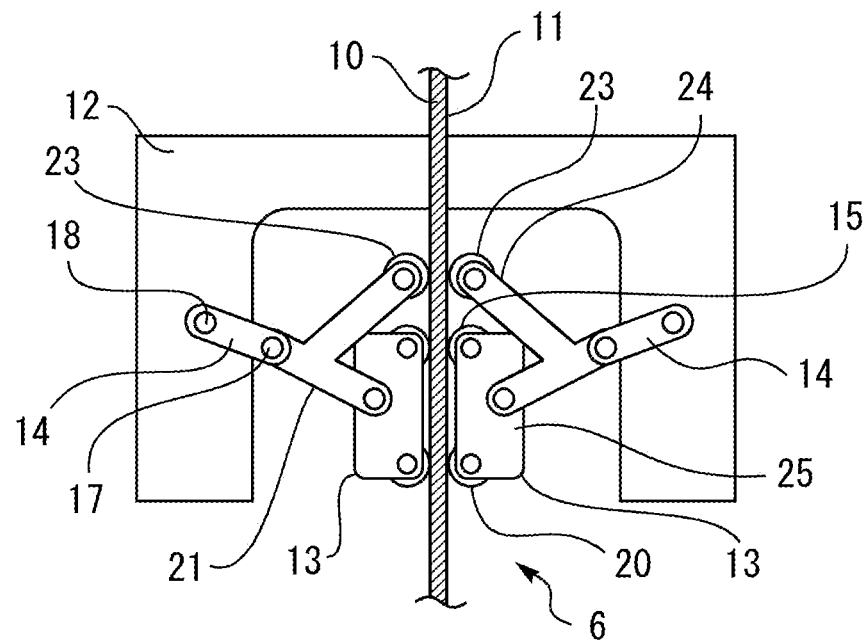
FIG. 11 A side view of a driving device according to a third modification of the second embodiment.

FIG. 11 is a side view of a driving device according to a third modification of the second embodiment.

The wheel unit 13 includes a second sub-wheel 23.

The second sub-wheel 23 is arranged side by side with the driving wheel 15 and the sub-wheel 20 in the lifting and lowering direction of the car 4. The second sub-wheel 23 is in contact with the guide surface 11 on the same side as the driving wheel 15 and the sub-wheel 20 with respect to the guide plate 10. In this example, the second sub-wheel 23 has the same configuration as the sub-wheel 20.

The wheel coupling section 21 includes a parent coupling section 24 and a child coupling section 25. The parent coupling section 24 is, for example, a link member having a Y shape. The parent coupling section 24 rotatably supports the second sub-wheel 23. The parent coupling section 24 rotatably supports the child coupling section 25. The parent coupling section 24 is rotatably connected to the first connecting section 17 of the link for self-boosting 14. The child coupling section 25 rotatably supports each of the driving wheel 15 and the sub-wheel 20. In this example, the child coupling section 25 supports the driving wheel 15 at the upper end portion. The child coupling section 25 supports the sub-wheel 20 at the lower end portion.

The child coupling section 25 functions as a pressing force averaging link between the driving wheel 15 and the sub-wheel 20. The parent coupling section 24 functions as a pressing force averaging link between the child coupling section 25 and the second sub-wheel 23. In this way, the wheel unit 13 is in contact with the guide surface 11 by the three wheels. Therefore, a pressing force per one wheel is further reduced.

Note that the wheel coupling section 21 may include a plurality of child coupling sections 25. In this way, the wheel unit 13 can average a pressing force with any number of wheels. The wheel unit 13 can keep an averaged pressing force equal.

Third Embodiment

Figure 12:
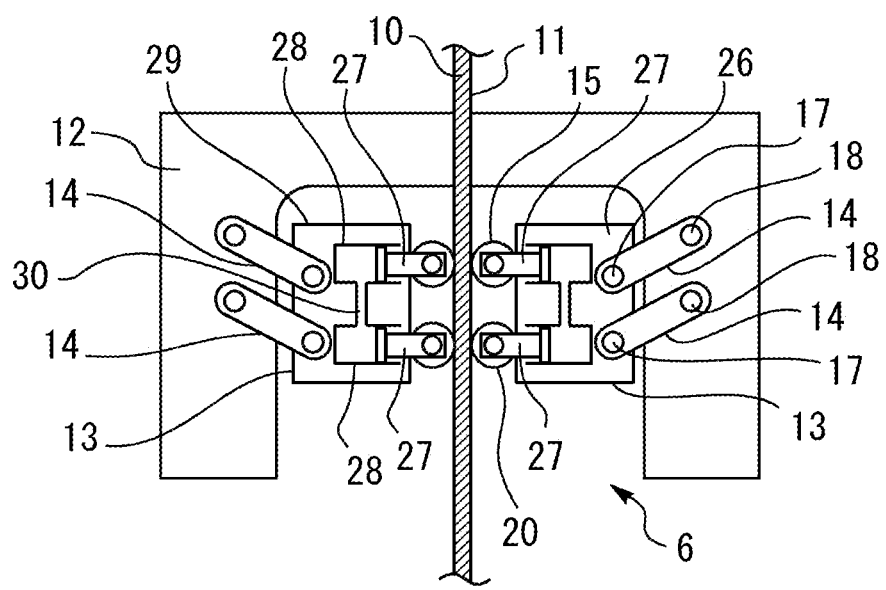
FIG. 12 A side view of a driving device according to a third embodiment.

FIG. 12 is a side view of a driving device according to a third embodiment.

The driving device 6 includes one or more links for self-boosting 14. In this example, the driving device 6 includes two links for self-boosting 14. When the driving device 6 includes a plurality of links for self-boosting 14, the plurality of links for self-boosting 14 are arranged, for example, in parallel to one another. In the plurality of links for self-boosting 14, the first connecting sections 17 are arranged in positions at an equal distance from the guide surface 11. In the plurality of links for self-boosting 14, the second connecting sections 18 are arranged in positions at an equal distance from the guide surface 11.

The wheel unit 13 includes the sub-wheel 20 and a differential mechanism 26.

The sub-wheel 20 is arranged side by side with the driving wheel 15 in the lifting and lowering direction of the car 4. The sub-wheel 20 is in contact with the guide surface 11 on the same side as the driving wheel 15 with respect to the guide plate 10. In this example, the sub-wheel 20 has the same configuration as the driving wheel IS. The sub-wheel 20 may be driven to rotate by the driving section. The sub-wheel 20 may be driven to rotate independently from the driving wheel 15.

The differential mechanism 26 is a mechanism that, when one of the driving wheel 15 or the sub-wheel 20 is displaced in a direction away from the guide surface 11, displaces the other of the driving wheel 15 or the sub-wheel 20 in the opposite direction of the direction. The differential mechanism 26 includes two pistons 27, two cylinders 28, and a holding section 29.

Each of the two pistons 27 is directed to a pressing direction in which the driving wheel 15 and the sub-wheel 20 cause pressing forces to act on the guide surface 11. One piston 27 rotatably supports the driving wheel 15 at the distal end in the pressing direction. The other piston 27 rotatably supports the sub-wheel 20 at the distal end in the pressing direction. The two pistons 27 are arranged side by side in the lifting and lowering direction of the car 4.

The two cylinders 28 are arranged side by side in the lifting and lowering direction of the car 4. The piston 27 on the upper side is inserted into the cylinder 28 on the upper side. The cylinder 28 on the upper side holds the piston 27 on the upper side to be able to move in the pressing direction and the opposite direction of the pressing direction. The piston 27 on the lower side is inserted into the cylinder 28 on the lower side. The cylinder 28 on the lower side holds the piston 27 on the lower side to be able to move in the pressing direction and the opposite direction of the pressing direction. The insides of the two cylinders 28 are coupled to each other by one channel 30. Oil is filled in the two cylinders 28.

The holding section 29 holds the two cylinders 28. The holding section 29 is rotatably connected to the first connecting section 17 of each of the one or more links for self-boosting 14.

Subsequently, an example of a motion of the driving device 6 is explained.

When the one or more links for self-boosting 14 function as boosting mechanisms, the differential mechanism 26 presses the driving wheel 15 and the sub-wheel 20 against the guide surface 11. At this time, since the one or more links for self-boosting 14 are arranged in parallel to one another, the differential mechanism 26 keeps a direction with respect to the guide surface 11.

When the wheel unit 13 comes to a step difference or the like on the rail 3, the driving wheel 15 or the sub-wheel 20 runs onto the step difference. An example in the case in which the driving wheel 15 runs onto the step difference is explained. At this time, the driving wheel 15 is displaced in a direction away from the guide surface 11. The piston 27 supporting the driving wheel 15 moves in the opposite direction of the pressing direction. The movement of the piston 27 supporting the driving wheel 15 is transmitted by the filled oil to, via the channel 30, the piston 27 supporting the sub-wheel 20. The piston 27 supporting the sub-wheel 20 moves in the pressing direction with a hydraulic pressure of the filled oil. Consequently, the sub-wheel 20 is displaced in a direction approaching the guide surface 11. In this way, in the wheel unit 13 a pressing force against the guide surface 11 is equalized. Note that the differential mechanism 26 moves in the same manner when the sub-wheel 20 runs onto the step difference.

As explained above, the first wheel unit of the conveying device according to the third embodiment includes the sub-wheel 20 and the differential mechanism 26. The sub-wheel 20 is arranged side by side with the first wheel in the lifting and lowering direction. The sub-wheel 20 is in contact with the guide surface 11 on the same side as the first wheel. When one of the first wheel or the sub-wheel 20 is displaced in the direction away from the guide surface 11, the differential mechanism 26 displaces the other of the first wheel or the sub-wheel 20 in the opposite direction of the direction.

Consequently, even when a step difference or the like occurs on the guide surface 11 of the rail 3, a pressing force by the driving wheel 15 or the like is averaged. Therefore, a trouble such as wear or fatigue fracture is suppressed from occurring early, because of a bias of pressing forces among a plurality of wheels in contact with the rail 3, in wheels on which a large pressing force is caused to act. The wheel unit 13 is prevented by the differential mechanism 26 from being easily snapped by the step difference or the like on the guide surface 11. The wheel unit 13 is prevented by the differential mechanism 26 from easily receiving a large shock from the step difference or the like on the guide surface 11. Therefore, during the lifting and lowering of the car 4, a sudden change less easily occurs in a frictional force between the driving wheel 15 and the rail 3. Consequently, instability of the lifting and lowering of the car 4 due to a slip or the like of the driving wheel 15 is reduced.

Note that the wheel unit 13 may include a plurality of sub-wheels 20. At this time, the differential mechanism 26 includes three or more pistons 27 and three or more cylinders 28. The three or more cylinders 28 are coupled to one another by the channel 30. Since a hydraulic pressure equally acts on the plurality of pistons 27, a pressing force is also equalized in the wheel unit 13 in contact with the guide surface 11 by three or more wheels.

Subsequently, a modification of the third embodiment is explained with reference to FIG. 13.

Figure 13:
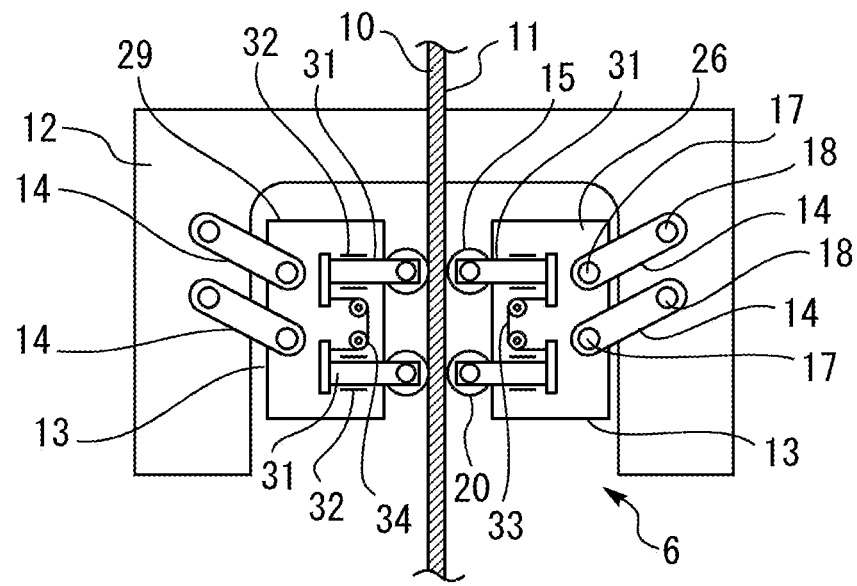
FIG. 13 A side view of a driving device according to the modification of the third embodiment.

FIG. 13 is a side view of a driving device according to the modification of the third embodiment.

The differential mechanism 26 includes two movable sections 31, two guides 32, the holding section 29, a wire 33, and a plurality of rollers 34.

Each of the two movable sections 31 is, for example, a plate-like or bar-like member. Each of the two movable sections 31 is directed to the pressing direction. One of the two movable sections 31 rotatably supports the driving wheel 15 at the distal end in the pressing direction. The other of the two movable sections 31 rotatably supports the sub-wheel 20 at the distal end in the pressing direction. The two movable sections 31 are arranged side by side in the lifting and lowering direction of the car 4.

The two guides 32 are arranged side by side in the lifting and lowering direction of the car 4. The guide 32 on the upper side guides the movable section 31 on the upper side to be able to move in the pressing direction and the opposite direction of the pressing direction. The guide 32 on the lower side guides the movable section 31 on the lower side to be able to move in the pressing direction and the opposite direction of the pressing direction.

The holding section 29 holds the two guides 32. The holding section 29 is rotatably connected to the first connecting section 17 of each of the one or more links for self-boosting 14.

Each of the plurality of rollers 34 is rotatably supported by the holding section 29. In this example, at least any one of the plurality of rollers 34 is arranged in a position closer to the guide surface 11 than end portions of the two movable sections 31 on the far side from the guide surface 11.

The wire 33 is attached to each of the two movable sections 31. In this example, one end of the wire 33 is attached to the end portion on the opposite side of the driving wheel 15 in the movable section 31 supporting the driving wheel 15. The other end of the wire 33 is attached to the end portion on the opposite side of the sub-wheel 20 in the movable section 31 supporting the sub-wheel 20. The wire 33 is wound on each of the plurality of rollers 34.

Subsequently, an example of a motion of the driving device 6 is explained.

When the one or more links for self-boosting 14 function as boosting mechanisms, the differential mechanism 26 presses the driving wheel 15 and the sub-wheel 20 against the guide surface 11. At this time, since the one or more links for self-boosting 14 are arranged in parallel to one another, the differential mechanism 26 keeps a direction with respect to the guide surface 11.

When the wheel unit 13 comes to a step difference or the like on the rail 3, the driving wheel 15 or the sub-wheel 20 runs onto the step difference. An example in the case in which the driving wheel 15 runs onto the step difference is explained. At this time, the driving wheel 15 is displaced in a direction away from the guide surface 11. The movable section 31 supporting the driving wheel 15 moves in the opposite direction of the pressing direction. The movable section 31 supporting the driving wheel 15 pulls the attached wire 33 in the opposite direction of the pressing direction. The wire 33 changes, with the rollers 34, a direction of a pulling force of the movable section 31 supporting the driving wheel 15 to thereby transmit the pulling force to the movable section 31 supporting the sub-wheel 20. The wire 33 pulls the movable section 31 supporting the sub-wheel 20 in the pressing direction. The movable section 31 supporting the sub-wheel 20 moves in the pressing direction by being pulled by the wire 33. Consequently, the sub-wheel 20 is displaced in a direction approaching the guide surface 11. In this way, a pressing force against the guide surface 11 is equalized in the wheel unit 13.

Fourth Embodiment

Figure 14:
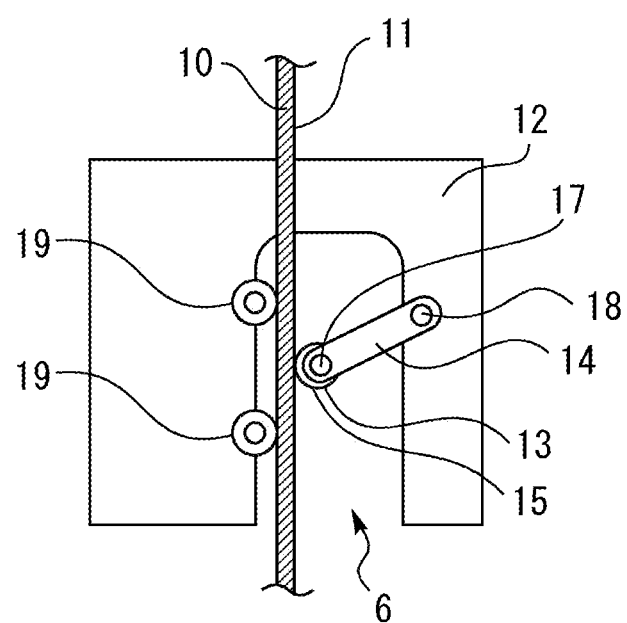
FIG. 14 A side view of the driving device 6 according to a fourth embodiment.

FIG. 14 is a side view of the driving device 6 according to a fourth embodiment.

The driving device 6 includes the link for self-boosting 14, the wheel unit 13, and two counter wheels 19. In the driving device 6, a set of the link for self-boosting 14 and the wheel unit 13 is arranged on one side with respect to the guide plate 10. The two counter wheels 19 are arranged on the other side with respect to the guide plate 10. The two counter wheels 19 are rotatably supported by the base 12. The two counter wheels 19 are arranged side by side in the lifting and lowering direction. One counter wheel 19 is in contact with the guide surface 11 above the rear side of a position of the rail 3 where the driving wheel 15 is in contact. The other counter wheel 19 is in contact with the guide surface 11 below the rear side of the position of the rail 3 where the driving wheel 15 is in contact.

In this way, on the opposite side of the driving wheel 15 across the guide plate 10, a plurality of fixed wheels are in contact with the guide plate 10 above and below the driving wheel 15. That is, the driving device 6 grips the guide plate 10 with one or more wheels in contact with the guide surface 11 on one side of the guide plate 10 and two or more wheels in contact with the guide surface 11 on the other side of the guide plate 10. Therefore, the posture of the car 4 is restrained. Consequently, when a loading load on the inside of the car cabin 5 deviates, for example, when a heavy object to be conveyed such as a truck is loaded on the car 4, a tilt of the car 4 is suppressed. A tilt angle of the link for self-boosting 14 changes, whereby a pressing force is suppressed from fluctuating. Therefore, the car 4 can stably run. Since the balance of the car 4 is kept, a drop of the car 4 due to coming-off of the driving device 6 from the rail 3 is prevented.

Note that the driving device 6 may include three or more counter wheels 19.

Subsequently, modifications of the fourth embodiment are explained with reference to FIGS. 15 and 16.

Figure 15:
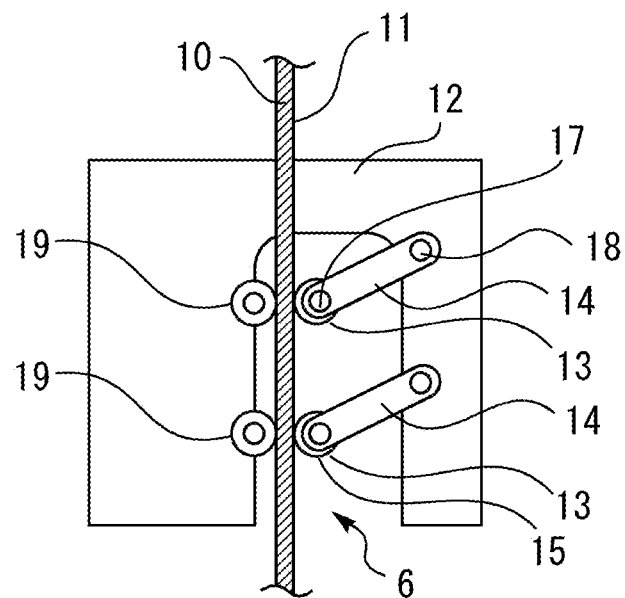
FIG. 15 A side view of a driving device according to a first modification of the fourth embodiment.

FIG. 15 is a side view of a driving device according to a first modification of the fourth embodiment.

Figure 16:
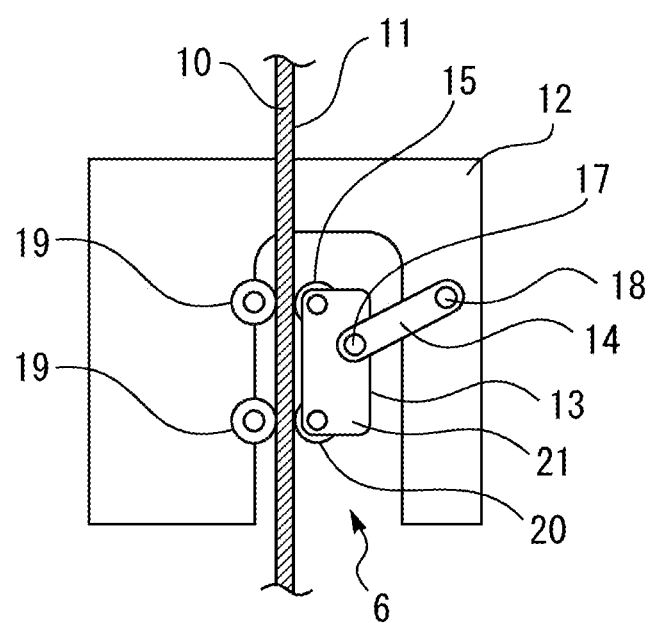
FIG. 16 A side view of a driving device according to a second modification of the fourth embodiment.

FIG. 16 is a side view of a driving device according to a second modification of the fourth embodiment.

As shown in FIG. 15, the driving device 6 may include two or more sets of the wheel unit 13 including one wheel, the link for self-boosting 14, and the counter wheel 19. The counter wheel 19 is in contact with the guide surface 11 on the rear side of a position of the rail 3 where the driving wheel 15 of the wheel unit 13 is in contact.

As shown in FIG. 16, the driving device 6 may include the wheel unit 13 including two wheels and two counter wheels 19. The two wheels of the wheel unit 13 are the driving wheel 15 and the sub-wheel 20 supported by the wheel coupling section 21. The counter wheel 19 on the upper side is in contact with the guide surface 11 on the rear side of a position of the rail 3 where the wheel on the upper side supported by the wheel coupling section 21 is in contact. The counter wheel 19 on the lower side is in contact with the guide surface 11 on the rear side of a position of the rail 3 where the wheel on the lower side supported by the wheel coupling section 21 is in contact.

In the configurations of these modifications, the counter wheels 19 are arranged on the rear side of the positions where the wheels of the wheel unit 13 are in contact with respect to the guide plate 10. Consequently, a pressing force by the wheels of the wheel unit 13 and a pressing force by the counter wheels 19 cancel each other. Consequently, bending deformation is suppressed from occurring in the rail 3.

Fifth Embodiment

Figure 17:
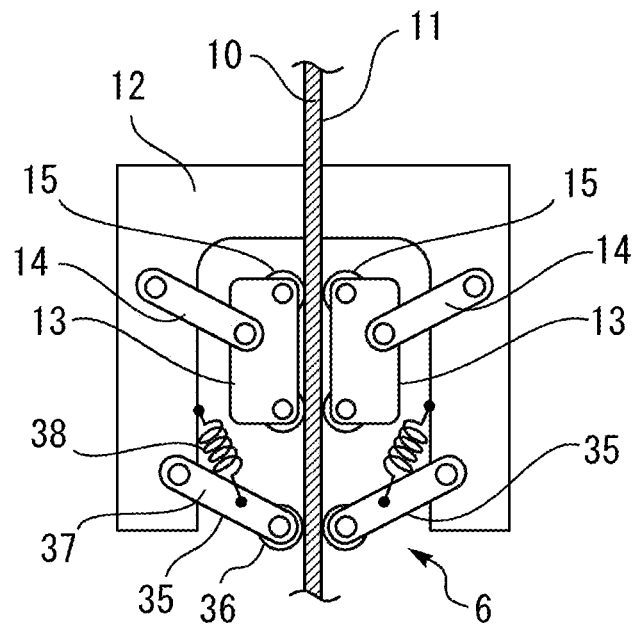
FIG. 17 A side view of a driving device according to a fifth embodiment.

FIG. 17 is a side view of a driving device according to a fifth embodiment.

The driving device 6 includes a posture restraining mechanism 35. The posture restraining mechanism 35 includes two sets of an auxiliary wheel 36, a posture restraining link 37, and a posture restraining spring 38. The posture restraining mechanism 35 is symmetrically arranged across the guide plate 10.

The auxiliary wheel 36 is in contact with the guide surface 11. In this example, the auxiliary wheel 36 is arranged below the wheel unit 13.

The posture restraining link 37 is, for example, a plate-like or bar-like link member. One end of the posture restraining link 37 is rotatably supported by the base 12. The other end of the posture restraining link 37 rotatably supports the auxiliary wheel 36.

One end of the posture restraining spring 38 is fixed to the base 12. The other end of the posture restraining spring 38 is fixed to the posture restraining link 37. In this example, the posture restraining spring 38 is arranged in a stretched state to lift the posture restraining link 37 upward with an elastic force. The posture restraining spring 38 is an example of the first elastic body. The posture restraining spring 38 holds, with an elastic force, the contact of the auxiliary wheel 36 with the guide surface 11. Force for pressing the auxiliary wheel 36 against the guide surface 11 is sufficiently smaller than force for pressing the driving wheel 15 against the guide surface 11. Therefore, the posture restraining mechanism 35 does not need a large spring for pressing the driving wheel 15 against the rail 3 with sufficiently large force to be able to support the car weight of the car 4.

As explained above, the first driving device of the conveying device according to the fifth embodiment includes the auxiliary wheel 36 and the first elastic body. The auxiliary wheel 36 is in contact with the guide surface 11 on the same side as the first wheel. One end of the first elastic body is connected to the loading-weight supporting section. The first elastic body maintains, with an elastic force, the contact of the auxiliary wheel 36 with the guide surface 11.

The driving wheel 15 and the auxiliary wheel 36 are in contact with the guide surface 11 on the same side as the rail 3 at two points. That is, the driving device 6 can receive a moment of the car 4 about to rotate. Consequently, a tilt of the car 4 is suppressed. Consequently, a pressing force of the driving wheel 15 is equalized on both sides of the rail 3. The auxiliary wheel 36 is elastically supported by the posture restraining spring 38. Therefore, the auxiliary wheel 36 can climb over a step difference on the guide surface 11 of the rail 3. Consequently, running of the car 4 is stabilized. The posture restraining mechanism 35 particularly effectively acts in the driving device 6 including the links for self-boosting 14 on both the sides of the rail 3. The posture restraining mechanism 35 particularly effectively acts in a configuration including one counter wheel 19 as in the configuration shown in FIG. 5.

Note that one end of the posture restraining spring 38 may be fixed to a rotating shaft of the auxiliary wheel 36. The posture restraining spring 38 may be provided between rotating shafts of two auxiliary wheels 36. At this time, the posture restraining spring 38 is arranged in a stretched state to press the two auxiliary wheels 36 against the guide plate 10 with an elastic force for pulling the two auxiliary wheels 36. The posture restraining spring 38 may be any elastic body such as a coil spring, a torsion spring, or a leaf spring.

Subsequently, a modification of the fifth embodiment is explained with reference to FIG. 18.

Figure 18:
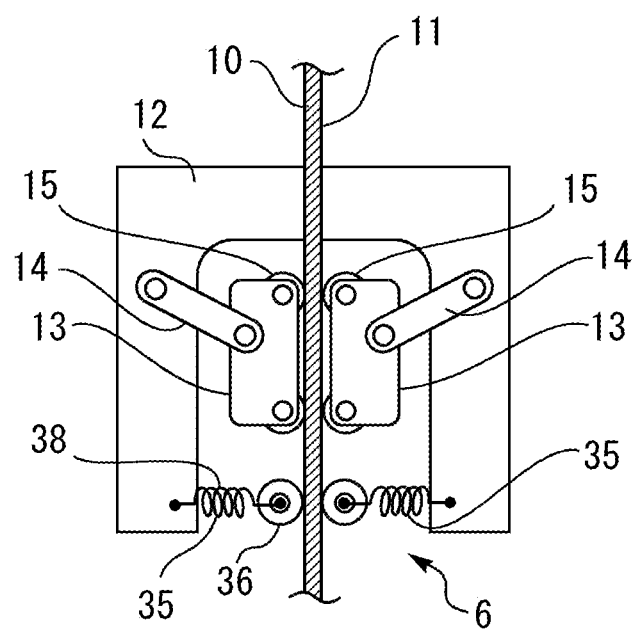
FIG. 18 A side view of a driving device according to the modification of the fifth embodiment.

FIG. 18 is a side view of a driving device according to the modification of the fifth embodiment.

The posture restraining mechanism 35 includes two sets of the auxiliary wheel 36 and the posture restraining spring 38. The posture restraining mechanism 35 is symmetrically arranged across the guide plate 10.

One end of the posture restraining spring 38 is fixed to the base 12. The other end of the posture restraining spring 38 is fixed to the rotating shaft of the auxiliary wheel 36. In this example, the posture restraining spring 38 is arranged in a compressed state to press the auxiliary wheel 36 against the guide plate 10 with an elastic force. The posture restraining spring 38 holds, with an elastic force, contact of the auxiliary wheel 36 with the guide surface 11. Force for pressing the auxiliary wheel 36 against the guide surface 11 is sufficiently smaller than a pressing force for pressing the driving wheel 15 against the guide surface 11. In such a configuration as well, the posture restraining mechanism 35 can suppress a tilt of the car 4.

Sixth Embodiment

Figure 19:
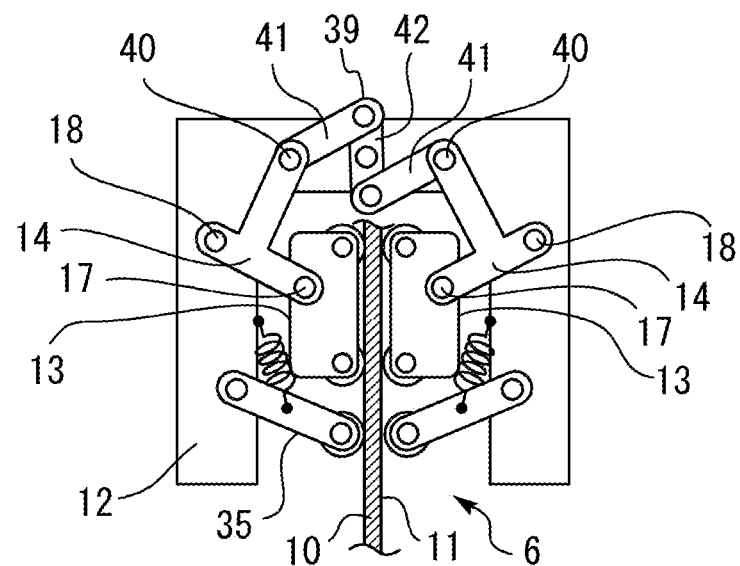
FIG. 19 A side view of a driving device according to a sixth embodiment.

FIG. 19 is a side view of a driving device according to a sixth embodiment. The driving device 6 includes two links for self-boosting 14, two wheel units 13, and a position restraining mechanism 39. The driving device 6 may include the posture restraining mechanism 35.

The links for self-boosting 14 and the wheel units 13 are symmetrically arranged across the guide plate 10. The links for self-boosting 14 are, for example, link members having a T shape. The links for self-boosting 14 include third connecting sections 40. The third connecting sections 40 are portions connected to the position restraining mechanism 39. The third connecting sections 40 are provided, for example, at end portions of portions extending upward from intermediate portions of the first connecting sections 17 and the second connecting sections 18.

The position restraining mechanism 39 is a mechanism that, when one wheel unit 13 is displaced in the horizontal direction, displaces the other wheel unit 13 in the opposite direction. The position restraining mechanism 39 includes two first links 41 and a second link 42. The two first links 41 and the second link 42 are point-symmetrically arranged with respect to the center of the second link 42. The center of the second link 42 is rotatably supported by the base 12. One end of the second link 42 is rotatably connected to an end portion of one first link 41. The other end of the second link 42 is rotatably connected to an end portion of the other first link 41. An end portion of the first link 41 on a side not connected to the second link 42 is rotatably connected to the third connecting section 40 of the link for self-boosting 14 arranged on the same side with respect to the guide plate 10.

Subsequently, an example of a motion of the driving device 6 is explained.

Figure 20:
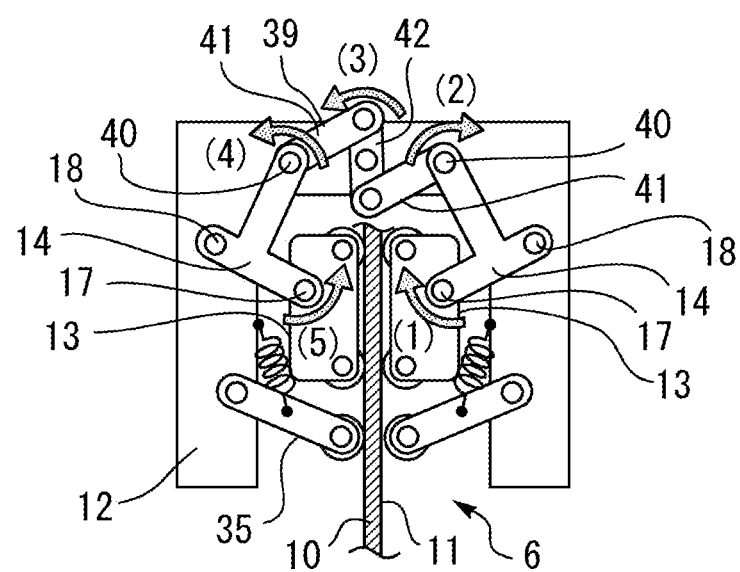
FIG. 20 A side view of the driving device according to the sixth embodiment.

FIG. 20 is a side view of the driving device according to the sixth embodiment.

One wheel unit 13 is an example of the first wheel unit. The other wheel unit 13 is an example of the second wheel unit. The link for self-boosting 14 to which the first wheel unit is connected is an example of the first coupling section. The link for self-boosting 14 to which the second wheel unit is connected is an example of the second coupling section. An example in the case in which the wheel unit 13 on the right side in FIG. 20 is the first wheel unit and the first wheel unit is displaced to approach the guide surface 11 is explained.

First, the first wheel unit on the right side of FIG. 20 is displaced in the left direction to approach the guide surface 11. Consequently, as indicated by (1) in FIG. 20, the first coupling section rotates clockwise centering on the second connecting section 18. As indicated by (2) in FIG. 20, the first coupling section pulls the first link 41 on the right side connected by the third connecting section 40 to the right side. As indicated by (3) in FIG. 20, the second link 42 rotates counterclockwise centering on a point supported by the base 12. Consequently, the second link 42 moves the first link 41 on the left side to the left side. As indicated (4) in FIG. 20, the second coupling section is rotated counterclockwise centering on the second connecting section 18 by the first link 41 on the left side connected by the third connecting section 40. As indicated by (5) in FIG. 20, the second coupling section pushes the second wheel unit connected by the first connecting section 17 to the right side. Consequently, the second wheel unit is displaced in the right direction to approach the guide surface 11.

By transmitting force in this way, when one wheel unit 13 is displaced in the horizontal direction, the position restraining mechanism 39 displaces the other wheel unit 13 in the opposite direction. Note that, when the second wheel unit is displaced to approach the guide surface 11, the position restraining mechanism 39 moves in the same manner. When any one of the wheel units 13 is displaced to separate from the guide surface 11, the position restraining mechanism 39 moves in the same manner.

As explained above, the conveying device according to the sixth embodiment includes the position restraining mechanism 39. The position restraining mechanism 39 transmits, to the second coupling section, rotation generated in the first coupling section by the displacement in the horizontal direction of the first wheel unit to displace the second wheel unit in the opposite direction of the first wheel unit. Alternatively, the position restraining mechanism 39 transmits, to the first coupling section, rotation generated in the second coupling section by the displacement in the horizontal direction of the second wheel unit to displace the first wheel unit in the opposite direction of the second wheel unit.

Consequently, when one wheel unit 13 moves in the horizontal direction to approach the guide surface 11, the position restraining mechanism 39 moves the other wheel unit 13 in the opposite direction to approach the guide surface 11. When one wheel unit 13 moves in the horizontal direction to move away from the guide surface 11, the position restraining mechanism 39 moves the other wheel unit 13 in the opposite direction to move away from the guide surface 11. Consequently, tilt angles of the links for self-boosting 14 on both sides across the guide plate 10 are kept at the same angle. Therefore, pressing forces by the wheel units 13 on both the sides are kept equal. Partial contact of the wheel units 13 in setting of the car 4 is corrected. Even when a large load occurs in the horizontal direction at an earthquake time or the like, it is possible to suppress a slip from occurring because the pressing forces by the wheel units 13 on both the sides across the guide plate 10 become unequal. Consequently, since the pressing forces of the wheel units 13 are kept at the earthquake time or the like, a drop of the car 4 due to a slip of the wheel units 13 is suppressed.

Note that the wheel unit 13 may have a configuration shown in FIG. 3 not including the wheel coupling section 21. The link for self-boosting 14 may be directly connected to the rotating shaft of the driving wheel 15. The wheel unit 13 may have a configuration shown in FIG. 11 including the parent coupling section 24 and the child coupling section 25. The link for self-boosting 14 may not have the T shape. The link for self-boosting 14 may have a Y shape.

Subsequently, modifications of the sixth embodiment are explained with reference to FIGS. 21 to 23.

Figure 21:
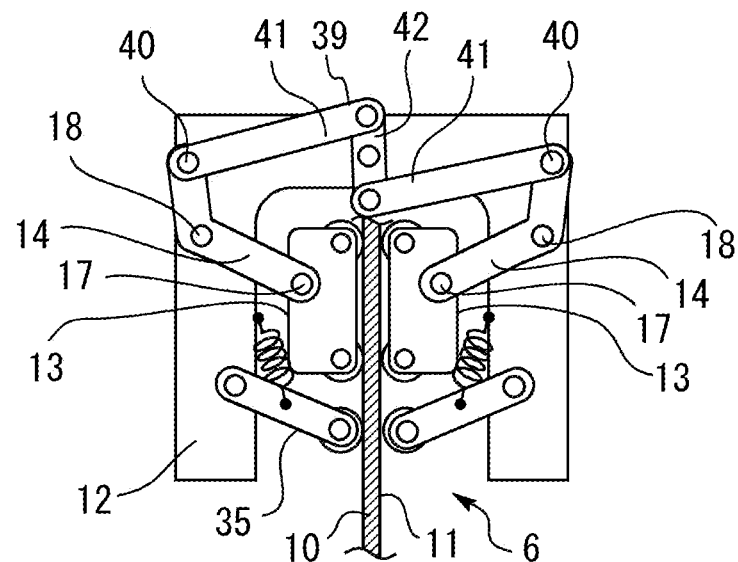
FIG. 21 A side view of a driving device according to a first modification of the sixth embodiment.

FIG. 21 is a side view of a driving device according to a first modification of the sixth embodiment.

Figure 22:
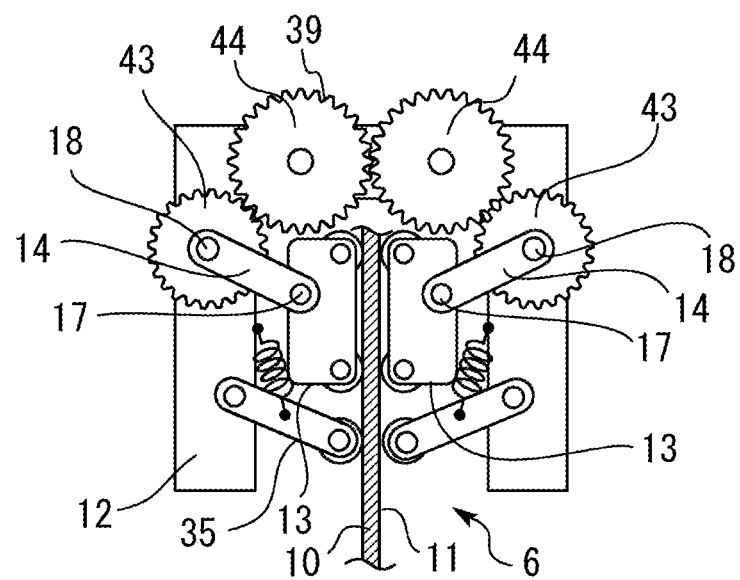
FIG. 22 A side view of a driving device according to a second modification of the sixth embodiment.

FIG. 22 is a side view of a driving device according to a second modification of the sixth embodiment.

Figure 23:
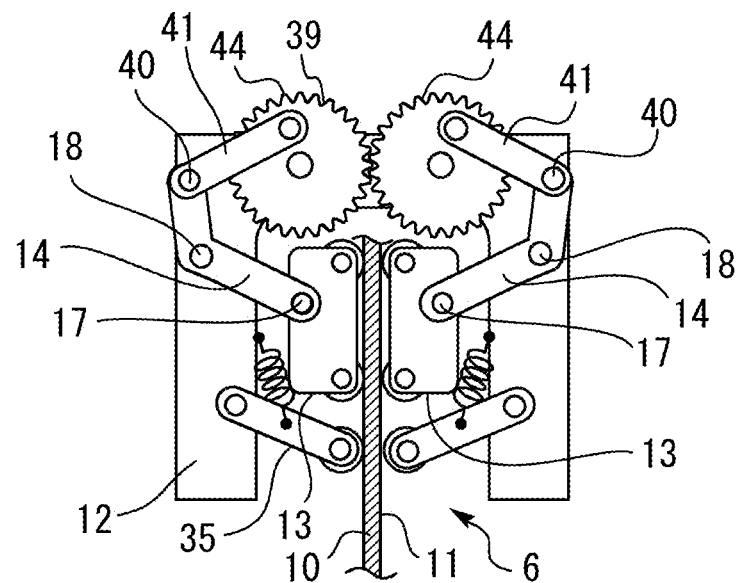
FIG. 23 A side view of a driving device according to a third modification of the sixth embodiment.

FIG. 23 is a side view of a driving device according to a third modification of the sixth embodiment.

In an example shown in FIG. 21, the link for self-boosting 14 is a link member having a V shape. The link for self-boosting 14 includes the first connecting section 17 at an end portion. The link for self-boosting 14 includes the second connecting section 18 in a bending portion in the center. The link for self-boosting 14 includes the third connecting section 40 at the end portion on the opposite side of the First connecting section 17.

Alternatively, in an example shown in FIG. 22, the link for self-boosting 14 includes a first gear 43. The first gear 43 is rotatably arranged centering on the second connecting section 18. The first gear 43 rotates together with rotation of the first connecting section 17. The position restraining mechanism 39 includes two second gears 44. The second gears 44 are rotatably connected to the base 12. The second gears 44 are arranged to mesh with each other. The second gears 44 are symmetrically arranged with respect to the guide plate 10. The second gears 44 are arranged to mesh with the first gears 43 arranged on the same sides with respect to the guide plate 10. The center of the second gear 44 is arranged closer to the guide plate 10 than the center of the first gear 43 meshing with the second gear 44.

An example of a motion of the driving device 6 in the case in which the wheel unit 13 on the right side of FIG. 22 is the first wheel unit and the first wheel unit is displaced to approach the guide surface 11 is explained.

First, the first wheel unit on the right side is displaced in the left direction to approach the guide surface 11. Consequently, the first coupling section on the right side rotates clockwise centering on the second connecting section 18. At this time, the first gear 43 on the right side also rotates clockwise. The second gear 44 on the right side meshing with the first gear 43 on the right side rotates counterclockwise. The second gear 44 on the left side meshing with the second gear 44 on the right side rotates clockwise. The first gear 43 on the left side meshing with the second gear 44 on the left side rotates counterclockwise. Consequently, the second coupling section on the left side rotates counterclockwise centering on the second connecting section 18. The second coupling section pushes the second wheel unit connected by the first connecting section 17 to the right side. Consequently, the second wheel unit is displaced in the right direction to approach the guide surface 11. By transmitting force in this way, when one wheel unit 13 is displaced in the horizontal direction, the position restraining mechanism 39 displaces the other wheel unit 13 in the opposite direction.

Alternatively, in an example shown in FIG. 23, the link for self-boosting 14 is the same link member having the V shape as the link member in the example shown in FIG. 21. The position restraining mechanism 39 includes two first links 41 and two second gears 44. The position restraining mechanism 39 is symmetrically arranged with respect to the guide plate 10. The first link 41 is connected to the second gear 44 arranged on the same side with respect to the guide plate 10.

An example of a motion of the driving device 6 in which the wheel unit 13 on the right side of FIG. 23 is the first wheel unit and the first wheel unit is displaced to approach the guide surface 11 is explained.

First, the first wheel unit on the right side is displaced in the left direction to approach the guide surface 11. Consequently, the first coupling section on the right side rotates clockwise centering on the second connecting section 18. The first coupling section pulls the first link 41 on the right side connected by the third connecting section 40 to the right side. The first link 41 pulls the connected second gear 44 on the right side to the right side to rotate the second gear 44 on the right side clockwise. The second gear 44 on the left side meshing with the second gear 44 on the right side rotates counterclockwise. The second gear 44 on the left side pushes the connected first link 41 on the left side to the left side. The second coupling section is rotated counterclockwise centering on the second connecting section 18 by the first link 41 on the left side connected by the third connecting section 40. The second coupling section pushes the second wheel unit connected by the first connecting section 17 to the right side. Consequently, the second wheel unit is displaced in the right direction to approach the guide surface 11. By transmitting force in this way, when one wheel unit 13 is displaced in the horizontal direction, the position restraining mechanism 39 displaces the other wheel unit 13 in the opposite direction.

Seventh Embodiment

Figure 24:
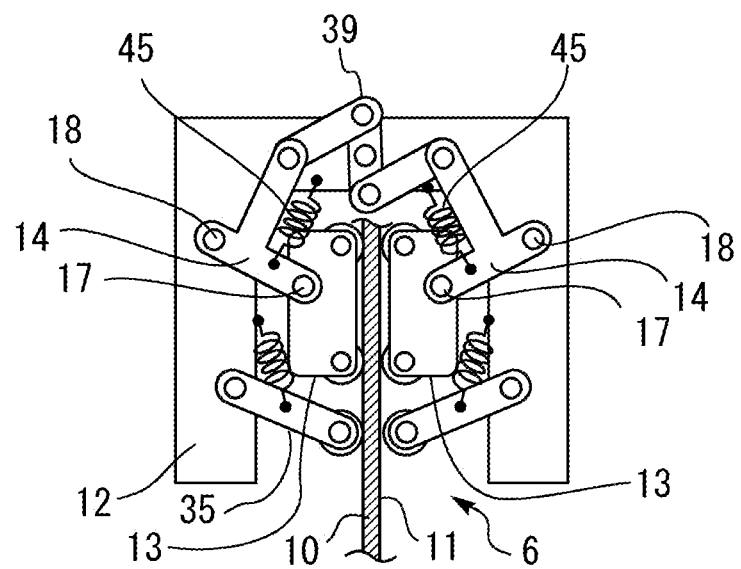
FIG. 24 A side view of a driving device according to a seventh embodiment.

FIG. 24 is a side view of a driving device according to a seventh embodiment. The driving device 6 includes two return springs 45.

The two return springs 45 are symmetrically arranged with respect to the guide plate 10. One ends of the return springs 45 are fixed to the base 12. The other ends of the return springs 45 are fixed to the link for self-boosting 14 arranged on the same side with respect to the guide plate 10. In this example, the return springs 45 are arranged in a stretched state to lift the link for self-boosting 14 upward with an elastic force. The return springs 45 are an example of the third elastic body. The return springs 45 hold, with an elastic force, contact of the driving wheel 15 with the guide surface 11. The elastic force by the return springs 45 is sufficiently smaller than a pressing force for pressing the driving wheel 15 against the guide surface 11 because the link for self-boosting 14 functions as a boosting mechanism. Therefore, the driving device 6 does not need a large spring for pressing the driving wheel 15 against the rail 3 with a sufficiently large force to be able to support the car weight of the car 4.

In this way, the first driving device of the conveying device according to the seventh embodiment includes the third elastic body. One end of the third elastic body is connected to the loading-weight supporting section. The other end of the third elastic body is connected to the first coupling section. The third elastic body maintains, with an elastic force, contact of the first wheel with the guide surface 11.

When a large load occurs in the horizontal direction at an earthquake time or the like, for example, even if the wheel unit 13 separates from the guide surface 11 irrespective of an action of the position restraining mechanism 39, the return springs 45 displace, with the elastic force, the wheel unit 13 to approach the guide surface 11. Consequently, the wheel unit 13 comes into contact with the guide surface 11 again. Therefore, a pressing force against the guide surface 11 by the wheel unit 13 is recovered. Consequently, the car 4 can more stably run.

Subsequently, modifications of the seventh embodiment are explained with reference to FIGS. 25 and 26.

Figure 25:
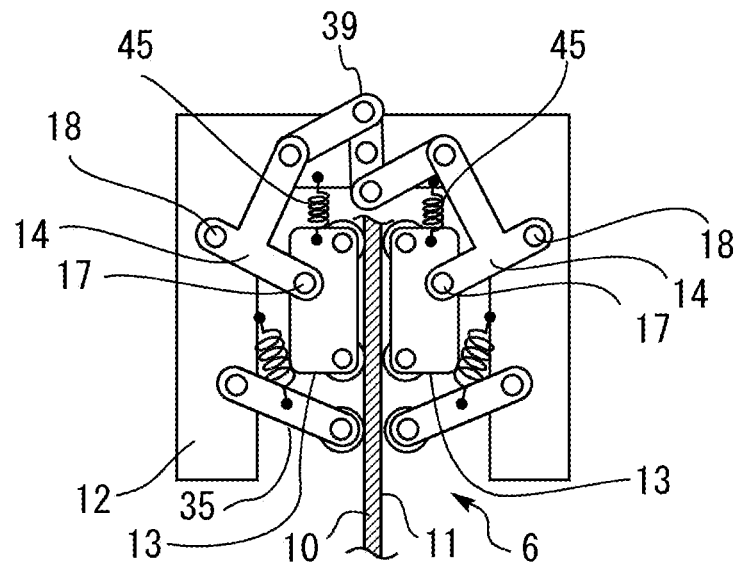
FIG. 25 A side view of a driving device according to a first modification of the seventh embodiment.

FIG. 25 is a side view of a driving device according to a first modification of the seventh embodiment.

Figure 26:
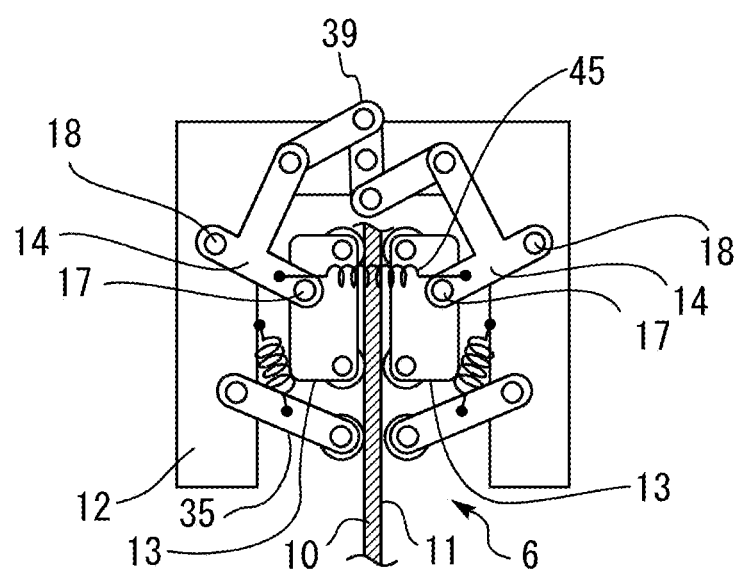
FIG. 26 A side view of a driving device according to a second modification of the seventh embodiment.

FIG. 26 is a side view of a driving device according to a second modification of the seventh embodiment.

In an example shown in FIG. 25, the driving device 6 includes two return springs 45. The two return springs 45 are symmetrically arranged with respect to the guide plate 10. One ends of the return springs 45 are fixed to the base 12. The other ends of the return springs 45 are fixed to the wheel unit 13 arranged on the same side with respect to the guide plate 10. In this example, the return springs 45 are arranged in a stretched state to lift the wheel unit 13 upward with an elastic force. The return springs 45 are an example of the fourth elastic body. The return springs 45 hold, with an elastic force, contact of the driving wheel 15 with the guide surface 11. The elastic force by the return springs 45 is sufficiently smaller than a pressing force for pressing the driving wheel 15 against the guide surface 11 because the link for self-boosting 14 functions as a boosting mechanism.

In this way, the first driving device of the conveying device according to the modification of the seventh embodiment includes the fourth elastic body. One end of the fourth elastic body is connected to the loading-weight supporting section. The other end of the fourth elastic body is connected to the first wheel unit. The fourth elastic body maintains, with an elastic force, contact of the first wheel with the guide surface 11.

In an example shown in FIG. 26, the driving device 6 includes one return spring 45. One end of the return spring 45 is fixed to the link for self-boosting 14 arranged on one side with respect to the guide plate 10. The other end of the return spring 45 is fixed to the link for self-boosting 14 arranged on the other side with respect to the guide plate 10. In this example, the return spring 45 is arranged in a stretched state to cause the two links for self-boosting 14 to pull each other. The return spring 45 is an example of the second elastic body. The return spring 45 holds, with an elastic force, contact of the driving wheel 15 with the guide surface 11. The elastic force by the return spring 45 is sufficiently smaller than a pressing force for pressing the driving wheel 15 against the guide surface 11 because the links for self-boosting 14 function as boosting mechanisms.

Note that the return spring 45 may be attached in a stretched state between the two wheel units 13 to cause the two wheel units 13 arranged on both sides with respect to the guide plate 10 to pull each other.

Alternatively, the return spring 45 may be attached between the link for self-boosting 14 arranged on one side with respect to the guide plate 10 and the wheel unit 13 arranged on the other side with respect to the guide plate 10. The return spring 45 is attached in a stretched state to cause the link for self-boosting 14 and the wheel unit 13 to pull each other. The driving device 6 may include a plurality of return springs 45.

In this way, the first driving device of the conveying device according to the modification of the seventh embodiment includes the second elastic body. One end of the second elastic body is connected to one of the first coupling section or the first wheel unit. The other end of the second elastic body is connected to one of the second coupling section or the second wheel unit. The second elastic body maintains, with an elastic force, contact of the first wheel with the guide surface 11.

Eighth Embodiment

Figure 27:
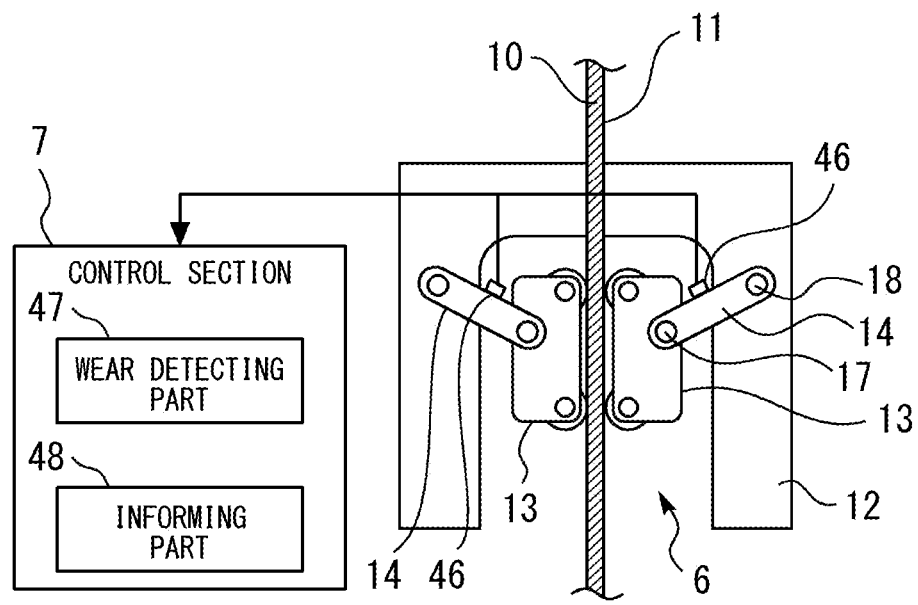
FIG. 27 A side view of a driving device according to an eighth embodiment.

FIG. 27 is a side view of a driving device according to an eighth embodiment.

The driving device 6 includes an angle detecting section.

The angle detecting section is a portion that detects a tilt angle of the link for self-boosting 14 from the horizontal plane. The angle detecting section is, for example, an angle sensor 46 provided in the link for self-boosting 14. The angle sensor 46 detects, for example, a direction of gravitational acceleration to detect an angle of the link for self-boosting 14. Alternatively, the angle detecting section may be a sensor such as an encoder or a resolver that detects a rotation amount in the second connecting section 18.

The control section 7 of the conveying device is connected to the angle detecting section to be able to acquire a signal representing the tilt angle detected by the angle detecting section. The control section 7 includes a wear detecting part 47 and an informing part 48.

The driving wheel 15 comes into contact with the guide surface 11 of the rail 3 and rotates to lift and lower the car 4. Therefore, the driving wheel 15 is worn by an operation of the elevator 1.

The wear detecting part 47 is a portion that detects wear of the driving wheel 15. When the wear of the driving wheel 15 worsens, the outer diameter of the driving wheel 15 decreases. On the other hand, even if the wear of the driving wheel 15 worsens, the distance between the second connecting section 18 of the link for self-boosting 14 and the guide surface 11 does not change. Therefore, the tilt angle of the link for self-boosting 14 decreases according to the worsening of the wear of the driving wheel 15. Accordingly, the wear detecting part 47 detects a wear amount of the driving wheel 15 based on the tilt angle of the link for self-boosting 14 detected by the angle sensor 46. The wear amount of the driving wheel 15 is, for example, a decrease amount of the outer diameter of the driving wheel 15. For example, when the wear amount of the driving wheel 15 exceeds a predetermined threshold, the wear detecting part 47 detects that the driving wheel 15 is worn.

The informing part 48 is a portion that informs the wear of the driving wheel 15 when the wear detecting part 47 detects that the driving wheel 15 is worn. The informing part 48 may transmit information representing the wear of the driving wheel 15 to a terminal device such as a management terminal that manages the conveying device. The informing part 48 may transmit the information representing the wear of the driving wheel 15 to, for example, a server of a monitoring center that remotely monitors information concerning the conveying device. The informing part 48 may be, for example, an indicator that is lit to inform the wear of the driving wheel 15. The informing part 48 may store transition of a wear state of a wheel. At this time, the informing part 48 may transmit information representing the stored transition to the management terminal, the server, or the like.

As explained above, the first driving device of the conveying device according to the eighth embodiment includes the angle detecting section and the wear detecting part 47. The angle detecting section detects a tilt angle θ of the first coupling section. The wear detecting part 47 detects, based on the angle detected by the angle detecting section, that the first wheel is worn.

The wear detecting part 47 detects, based on the tilt angle of the link for self-boosting 14, that the driving wheel 15 is worn. Therefore, a wear state of the driving wheel 15 is detected not by, for example, visual confirmation by a maintenance person. Consequently, it is possible to detect the driving wheel 15, the outer diameter of which is reduced by the wear. The detected driving wheel 15 may be replaced by the maintenance person or the like. It is possible to set a replacement period for the driving wheel 15 based on the transition of the wear state of the driving wheel 15. It is possible to detect uneven wear of the driving wheel 15 based on an output waveform of the transition of the wear state.

Subsequently, modifications of the eighth embodiment are explained with reference to FIGS. 28 to 30.

Figure 28:
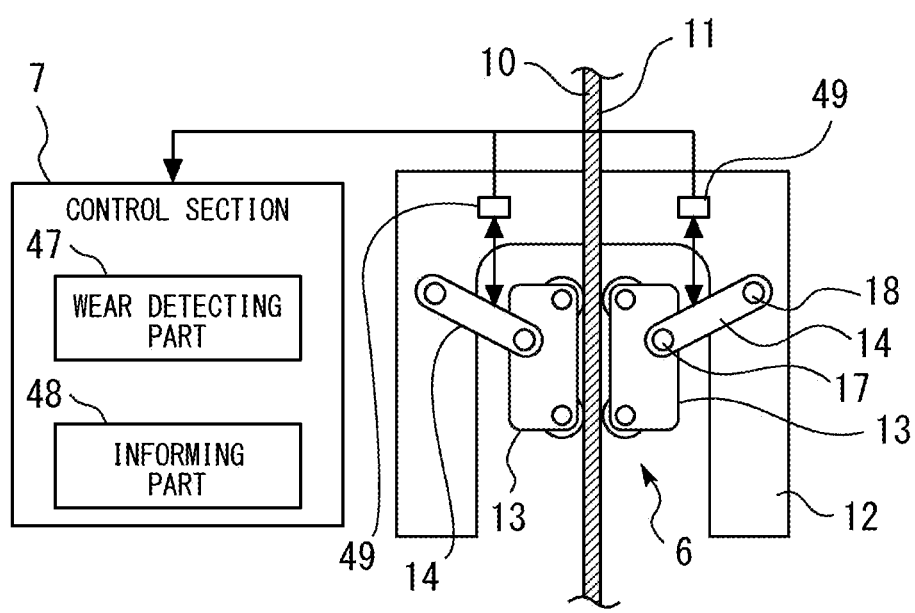
FIG. 28 A side view of a driving device according to a first modification of the eighth embodiment.

FIG. 28 is a side view of a driving device according to a first modification of the eighth embodiment.

Figure 29:
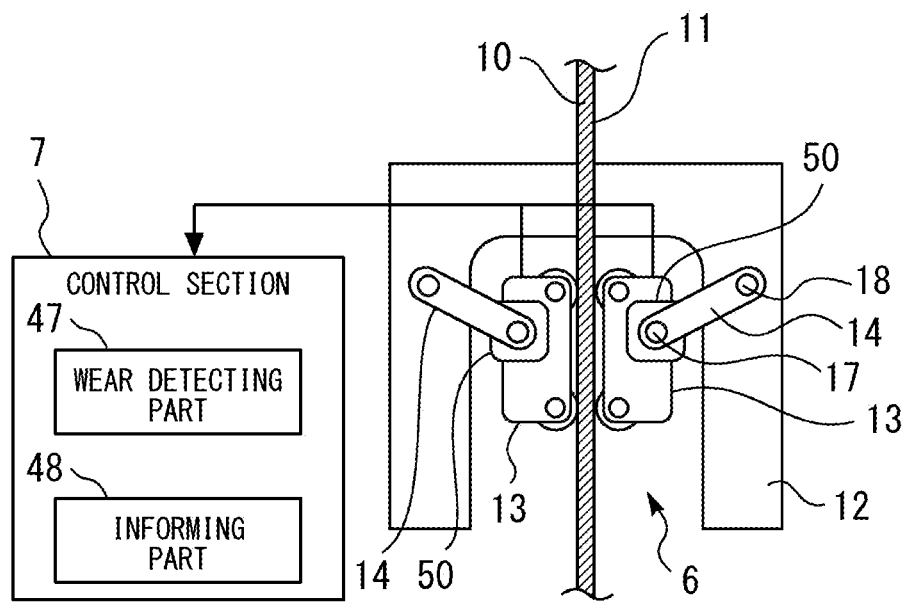
FIG. 29 A side view of a driving device according to a second modification of the eighth embodiment.

FIG. 29 is a side view of a driving device according to a second modification of the eighth embodiment.

Figure 30:
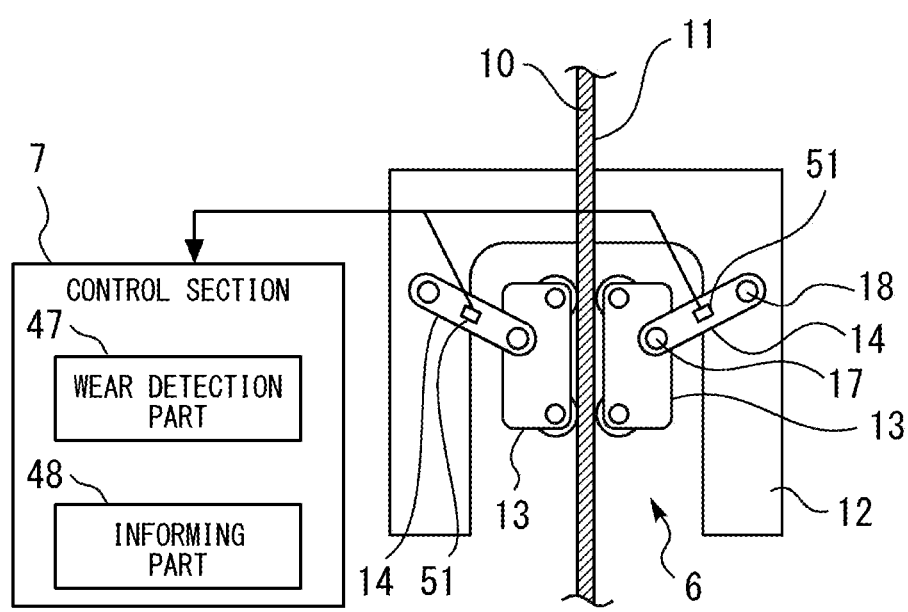
FIG. 30 A side view of a driving device according to a third modification of the eighth embodiment.

FIG. 30 is a side view of a driving device according to a third modification of the eighth embodiment.

In an example shown in FIG. 28, the angle detecting section is, for example, a displacement meter 49 provided in the base 12. The displacement meter 49 measures the distance to the link for self-boosting 14 due to a change in a tilt angle to thereby detect a tilt angle of the link for self-boosting 14. The displacement meter 49 may be, for example, a distance meter of a contact type or a noncontact type.

In an example shown in FIG. 29, the driving device 6 includes a pressing-force detecting section.

The pressing-force detecting section is a portion that detects a pressing force against the guide surface 11 by the wheel unit 13. The pressing-force detecting section is, for example, a load cell 50 connected to the first connecting section 17 of the link for self-boosting 14.

The control section 7 is connected to the pressing-force detecting section to be able to acquire a signal representing the pressing force detected by the pressing-force detecting section.

The tilt angle of the link for self-boosting 14 decreases according to the worsening of the wear of the driving wheel 15. When the tilt angle of the link for self-boosting 14 decreases, the pressing force increases. Accordingly, the wear detecting part 47 detects a wear amount of the driving wheel 15 based on the pressing force detected by the pressing-force detecting section. The wear amount of the driving wheel 15 is, for example, a decrease amount of the outer diameter of the driving wheel 15. For example, when the wear amount of the driving wheel 15 exceeds the predetermined threshold, the wear detecting part 47 detects that the driving wheel 15 is worn.

As shown in FIG. 30, the pressing-force detecting section may be a strain gauge 51 attached to the link for self-boosting 14. The strain gauge 51 measures strain of the link for self-boosting 14 caused by the pressing force to thereby detect the pressing force.

In this way, the first driving device of the conveying device according to the modification of the eighth embodiment includes the pressing-force detecting section and the wear detecting part 47. The pressing-force detecting section detects a pressing force for pressing the first wheel against the guide surface 11. The wear detecting part 47 detects, based on the pressing force detected by the pressing-force detecting section, that the first wheel is worn.

Ninth Embodiment

Figure 31:
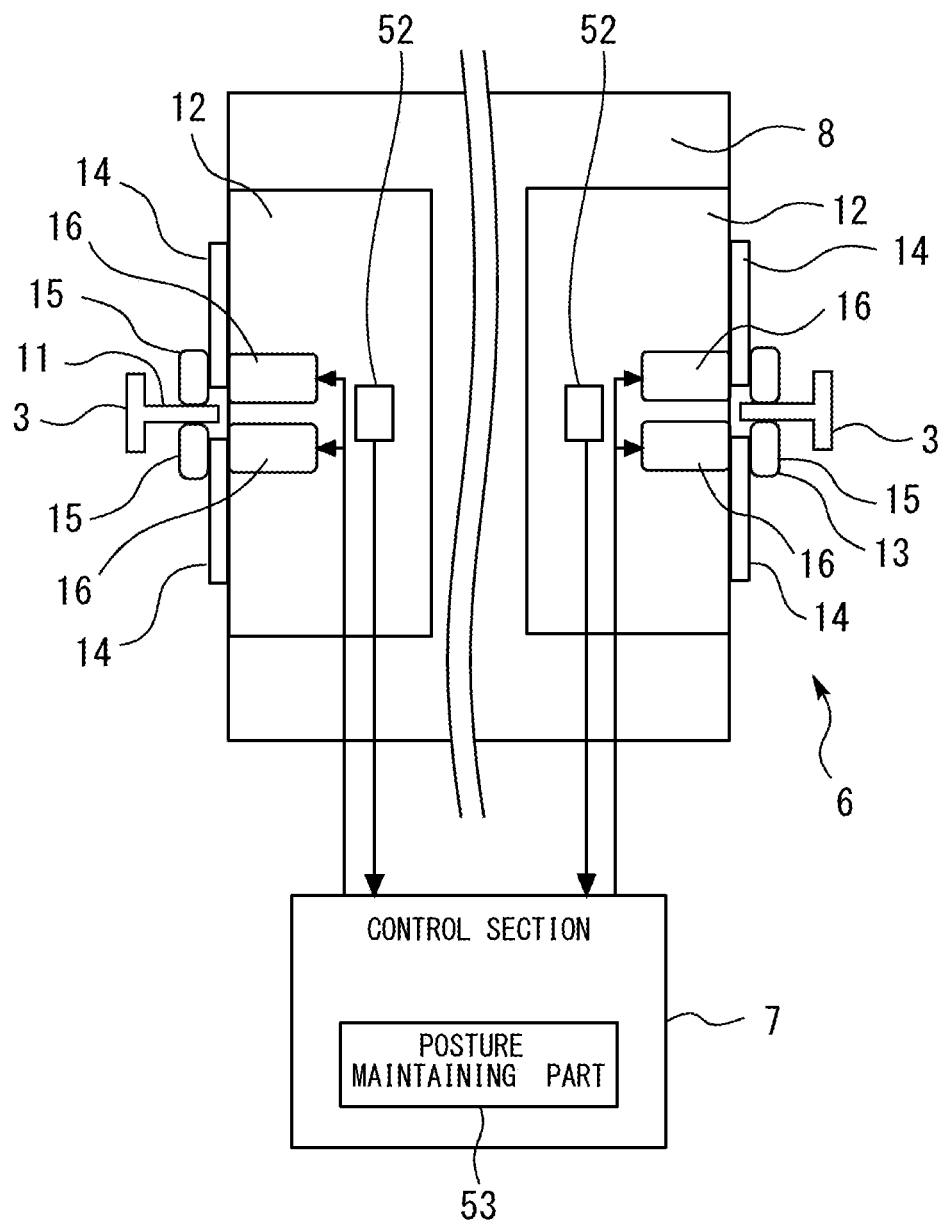
FIG. 31 A bottom view of a conveying device according to a ninth embodiment.

FIG. 31 is a bottom view of a conveying device according to a ninth embodiment.

The car 4 moves up and down between two rails 3. The two rails 3 are arranged on both the left and right sides of the car 4. The car 4 includes two driving devices 6. The two driving devices 6 are symmetrically arranged in the left-right direction with respect to the center of the car 4. One driving device 6 grips the rail 3 on the left side. The other driving device 6 grips the rail 3 on the right side. Each of the two driving devices 6 includes two links for self-boosting 14 and two wheel units 13. The two links for self-boosting 14 are symmetrically arranged in the front-rear direction with respect to the guide plate 10. The two wheel units 13 are symmetrically arranged in the front-rear direction with respect to the guide plate 10.

For example, the rail 3 on the right side is an example of the first rail. The rail 3 on the left side is an example of the second rail. The driving device 6 on the right side that grips the first rail is an example of the first driving device. The driving device 6 on the left side that grips the second rail is an example of the second driving device. In the first driving device, the wheel unit 13 on the front side is an example of the first wheel unit. In the first driving device, the wheel unit 13 on the rear side is an example of the second wheel unit. In the second driving device, the wheel unit 13 on the front side is an example of the third wheel unit. In the second driving device, the wheel unit 13 on the rear side is an example of the fourth wheel unit. The link for self-boosting 14 connected to the first wheel unit is an example of the first coupling section. The driving wheel 15 of the first wheel unit is an example of the first wheel. Similarly, a second coupling section and a second wheel correspond to the second wheel unit. Similarly, a third coupling section and a third wheel correspond to the third wheel unit. Similarly, a fourth coupling section and a fourth wheel correspond to the fourth wheel unit. The first wheel and the second wheel are arranged in symmetrical positions across the guide plate 10 of the rail 3 on the right side. The third wheel and the fourth wheel are arranged in symmetrical positions across the guide plate 10 of the rail 3 on the left side. The driving device 6 drives to rotate the four driving wheels 15 with four driving sections. The four driving sections are, for example, motors 16 directly coupled to the four driving wheels 15.

The conveying device includes a posture detecting section. The posture detecting section is a portion that detects the posture of the car 4. The posture of the car 4 is, for example, a tilt of the car 4. The posture detecting section is, for example, a posture sensor 52 arranged on the lower surface of the base 12. The posture sensor 52 is, for example, an inclination sensor.

The control section 7 of the elevator 1 is connected to the posture detecting section to be able to acquire a signal representing the posture of the car 4 detected by the posture detecting section. The control section 7 includes a posture maintaining part 53.

The posture maintaining part 53 is a portion that maintains the posture of the car 4. The control section 7 is connected to the four driving sections to be able to output, to the four driving sections, control signals for driving to rotate the four driving wheels 15 of the driving device 6.

For example, when a heavy object to be conveyed is unevenly loaded on the front side of the car 4, the posture of the car 4 tilts to be lowered on the front side. At this time, the posture sensor 52 detects the posture of the car 4 lowered on the front side. The posture maintaining part 53 increases, based on a signal acquired from the posture sensor 52, the number of rotations of the driving wheel 15 that is in contact with the guide surface 11 on the front side. The posture maintaining part 53 increases, for example, outputs of the first driving section and the third driving section. The posture maintaining part 53 reduces the number of rotations of the driving wheels 15 that is in contact with the guide surface 11 on the rear side. The posture maintaining part 53 reduces, for example, outputs of the second driving section and the third driving section. Consequently, since the front side of the car 4 is lifted, the posture of the car 4 is maintained. The posture maintaining part 53 determines whether the posture of the car 4 is within an allowable range set in advance. When determining that the posture of the car 4 is within the allowable range, the posture maintaining part 53 equalizes outputs of the four driving sections. The posture maintaining part 53 operates in the same manner when the posture of the car 4 tilts to be lowered to the rear side, the right side, and the left side.

As explained above, the conveying device according to the ninth embodiment includes a posture detecting section, the second driving device, and the control section 7. The posture detecting section detects the posture of the loading-weight supporting section. The second driving device is provided in the loading-weight supporting section. The second driving device lifts and lowers the loading-weight supporting section along the second rail. The second rail extends in parallel to the first rail on the opposite side of the first rail across the loading-weight supporting section. The control section 7 controls motions of the first driving device and the second driving device. The second driving device includes the third wheel and the fourth wheel. The third wheel is in contact with the second rail. The third wheel is driven to rotate based on control by the control section 7. The fourth wheel is in contact with the second rail. The fourth wheel is provided in a position symmetrical to the third wheel across the second rail. The fourth wheel is driven to rotate based on control by the control section 7. The control section 7 rotates each of the first wheel, the second wheel, the third wheel, and the fourth wheel according to the posture detected by the posture detecting section to maintain the posture of the loading-weight supporting section.

Consequently, the posture of the car 4 is maintained by active control. Therefore, the car 4 can more stably run.

Tenth Embodiment

Figure 32:
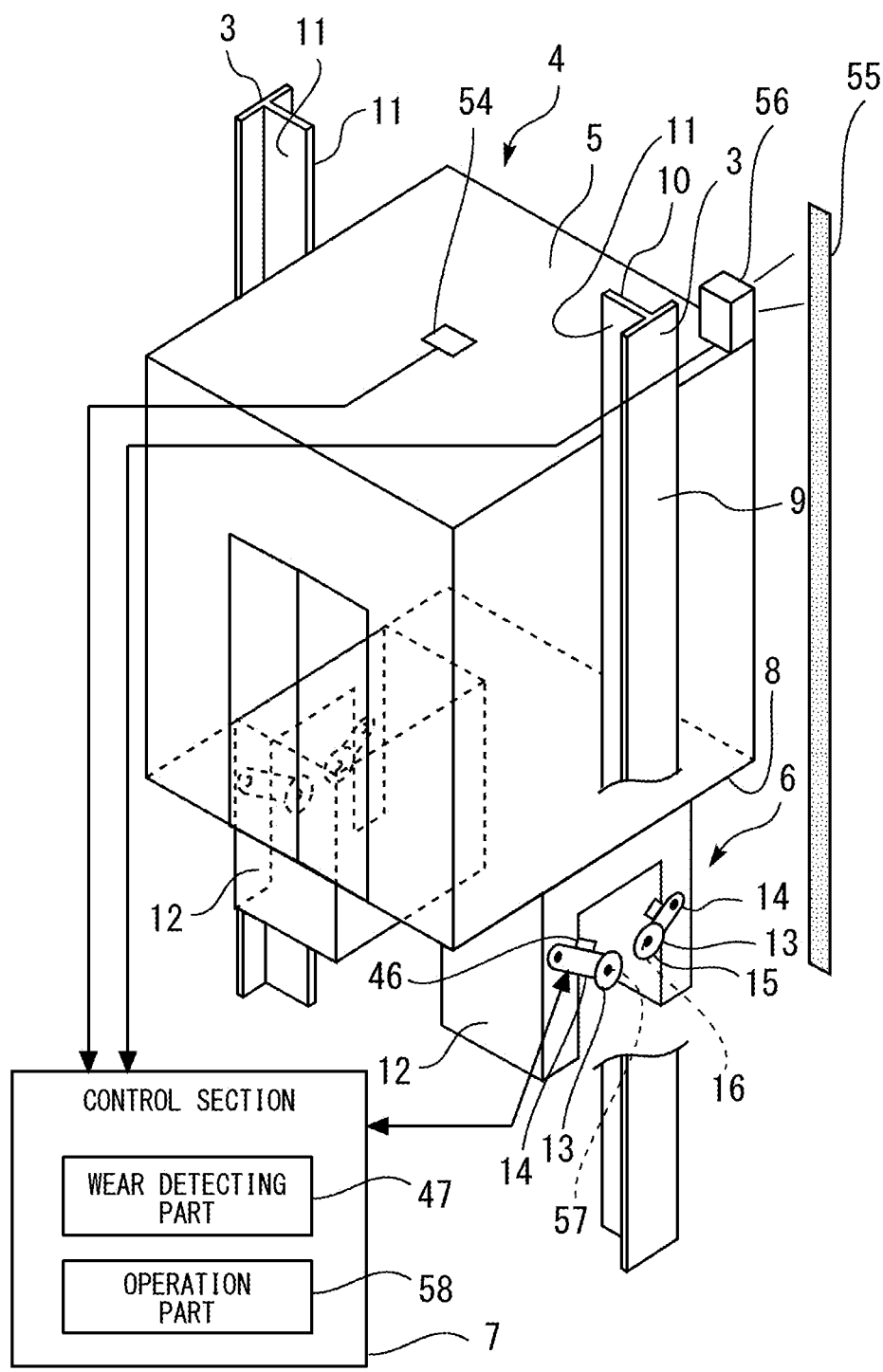
FIG. 32 A perspective view of a conveying device according to a tenth embodiment.

FIG. 32 is a perspective view of a conveying device according to a tenth embodiment.

The elevator 1 includes a distance detecting section and a rotation detecting section.

The distance detecting section is a portion that measures a lifting and lowering distance of the car 4. The distance detecting section is provided, for example, in the car 4. The distance detecting section may be a distance sensor 54 that detects the lifting and lowering distance based on a motion of the car 4. The distance sensor 54 may be, for example, an acceleration sensor or a speed sensor that detects the lifting and lowering distance of the car 4 by integrating measured acceleration or speed of the motion of the car 4 with time to thereby detect the lifting and lowering distance of the car 4. Alternatively, the distance detecting section may be, for example, a distance sensor 56 that detects a position tape 55, a marker, or the like provided in the shaft 2 to detect the lifting and lowering distance.

The rotation detecting section is a portion that detects a rotation amount of the driving wheel 15. The rotation detecting section may be, for example, a motor 16 that is a driving section as well. The rotation detecting section may calculate a rotation amount based on, for example, a driving current of the motor 16. Alternatively, the rotation detecting section may be a rotation sensor 57 provided in a rotating shaft of the motor 16. The rotation sensor 57 may be, for example, an encoder or a resolver.

The driving device 6 includes an angle detecting section. The angle detecting section is, for example, the angle sensor 46. The driving device 6 may include a pressing-force detecting section.

The control section 7 of the conveying device is connected to the distance detecting section to be able to acquire a signal representing the lifting and lowering distance detected by the distance detecting section. The control section 7 is connected to the rotation detecting section to be able to acquire a signal representing the rotation amount detected by the rotation detecting section. The control section 7 is connected to the angle detecting section to be able to acquire a signal representing the tilt angle detected by the angle detecting section. The control section 7 includes the wear detecting part 47 and an operation part 58.

The operation part 58 is a portion that estimates a slip amount of the driving wheel 15. The operation part 58 acquires a wear amount of the driving wheel 15 detected by the wear detecting part 47. The operation part 58 estimates an outer diameter of the driving wheel 15 based on the wear amount. The operation part 58 acquires a rotation amount of the driving wheel 15 detected by the rotation sensor 57. The operation part 58 calculates an estimated moving distance of the car 4 based on the estimated outer diameter of the driving wheel 15 and the rotation amount of the driving wheel 15.

The estimated moving distance is equivalent to a moving distance of the car 4 in the case in which there is no slip between the driving wheel 15 and the guide surface 11. The operation part 58 acquires an actual lifting and lowering distance detected by the distance sensor 54 or the distance sensor 56. The operation part 58 estimates a slip amount between the driving wheel 15 and the guide surface 11 based on the difference between the estimated moving distance and the actual lifting and lowering distance.

As explained above, the conveying device according to the tenth embodiment includes the distance detecting section, the rotation detecting section, and the operation part 58. The distance detecting section measures a lifting and lowering distance of the loading-weight supporting section. The rotation detecting section detects a rotation amount of the first wheel. The operation part 58 calculates an estimated moving distance of the loading-weight supporting section from the outer diameter of the first wheel, which is calculated from the wear amount detected by the wear detecting part 47, and the rotation amount detected by the rotation detecting section. The operation part 58 compares the estimated moving distance and the distance detected by the distance detecting section to estimate a slip amount of the first wheel.

Consequently, the control section 7 can correct, for example, an output of the driving section based on the slip amount estimated by the operation part 58. Consequently, the lifting and lowering distance of the car 4 is corrected. When the slip amount is larger than a threshold set in advance, the control section 7 may reduce the lifting and lowering speed of the car 4. At this time, the control section 7 may temporarily stop the car 4. Consequently, since a contact state of the driving wheel 15 and the guide surface 11 is improved, the slip amount can be reduced.

Eleventh Embodiment

Figure 33:
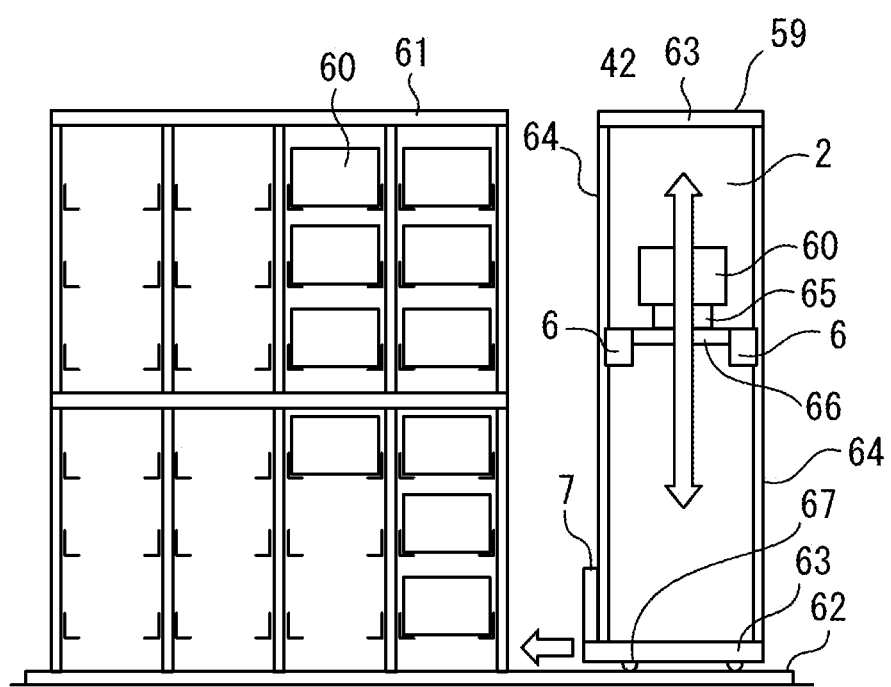
FIG. 33 A front view of a conveying device according to an eleventh embodiment.

FIG. 33 is a front view of a conveying device according to an eleventh embodiment.

In FIG. 33, a stacker crane 59 is shown as an example of the conveying device. The stacker crane 59 is a device that conveys an object to be conveyed in a lifting and lowering direction, for example, in a warehouse. The object to be conveyed is, for example, a cargo 60. In the warehouse in this example, a shelf 61 is provided. The cargo 60 is stored in the shelf 61. In the warehouse, a running rail 62 is provided. The running rail 62 is provided, for example, on a floor.

The stacker crane 59 includes two frames 63 at the upper end portion and the lower end portion, two masts 64, a fork 65, a cargo deck 66, two driving devices 6, and the control section 7. In this example, the control section 7 is provided, for example, in the frame 63 at the lower end portion.

The frame 63 on the lower side includes a running device 67. The running device 67 is a device that horizontally moves on the running rail 62. The masts 64 are members extending in the lifting and lowering direction. The lower ends of the two masts 64 are connected to the frame 63 on the lower side. The upper ends of the two masts 64 are connected to the frame 63 on the upper side. The two masts 64 are an example of the first rail or the second rail. The two masts 64 include the guide surfaces 11. The guide surfaces 11 are surfaces extending in the longitudinal direction of the masts 64. In this example, the shaft 2 is an opened space surrounded by the two frames 63 and the two masts 64. The shaft 2 is a space extending in the lifting and lowering direction. In this example, the shaft 2 is moved together with the frames 63 and the masts 64 by the running device 67.

The fork 65 is a portion for loading the cargo 60. The fork 65 includes a slide mechanism to be able to put the cargo 60 to be loaded in and take the cargo 60 out of the shelf 61.

The cargo deck 66 is a portion that supports the fork 65. The cargo deck 66 supports the load of the fork 65 and the cargo 60. The cargo deck 66 is an example of the loading-weight supporting section.

The two driving devices 6 are provided in the cargo deck 66. The driving device 6 on the right side grips the mast 64 on the right side. The driving device 6 on the left side grips the mast 64 on the left side.

Figure 34:
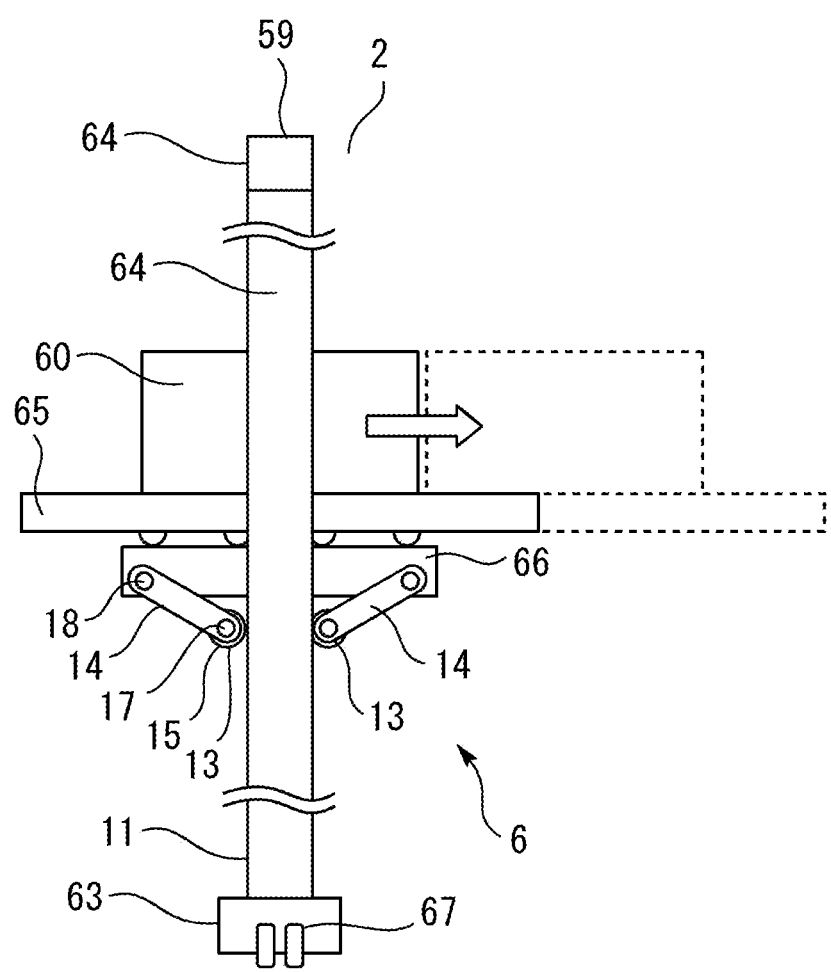
FIG. 34 A side view of the conveying device according to the eleventh embodiment.

FIG. 34 is a side view of the conveying device according to the eleventh embodiment.

The driving device 6 includes two links for self-boosting 14 and two wheel units 13. The links for self-boosting 14 and the wheel units 13 are symmetrically arranged on both sides across the mast 64. The links for self-boosting 14 are rotatably connected to the cargo deck 66 by the second connecting section 18. The driving wheel 15 of one wheel unit 13 is in contact with, for example, the guide surface 11 on the front side of the mast 64. The driving wheel 15 of the other wheel unit 13 is in contact with, for example, the guide surface 11 on the rear side of the mast 64.

Subsequently, an example of a motion of the stacker crane 59 is explained.

The fork 65 of the stacker crane 59 loads the cargo 60, for example, on a floor surface. The stacker crane 59 is moved in the horizontal direction to the front of the shelf 61 by the running device 67.

The driving device 6 drives to rotate the driving wheel 15 to thereby move the cargo deck 66 upward. The fork 65 moves the cargo 60 into the shelf 61 with the slide mechanism. After the cargo 60 is stored in the shelf 61, the fork 65 is returned to the original position by the slide mechanism. In this way, the stacker crane 59 stores the cargo 60. Note that the stacker crane 59 operates in the same manner when the cargo 60 is taken out.

Any of the characteristics disclosed in the embodiments explained above may be applied to the stacker crane 59. Any of the driving devices 6, the control section 7, and the like in the embodiments explained above may be applied to the stacker crane 59. Consequently, the driving device 6 light in weight and having a simple configuration can be applied to the stacker crane 59. The stacker crane 59 can stably convey the cargo 60 even when the center of gravity of the cargo 60 deviates.

Note that the running rail 62 may not be arranged on the floor. The running rail 62 may be arranged on a ceiling. Or the running rail 62 may be arranged at the height of the top portion of the shelf 61. At this time, the running device 67 may be provided in the frame 63 on the upper side.

The stacker crane 59 may be a stacker crane of a stationary type that does not move in the horizontal direction. At this time, the stacker crane 59 may place, on the cargo deck 66, a truck movable in the horizontal direction on which an object to be conveyed is loaded and move up and down to convey the object to be conveyed.

Twelfth Embodiment

Figure 35:
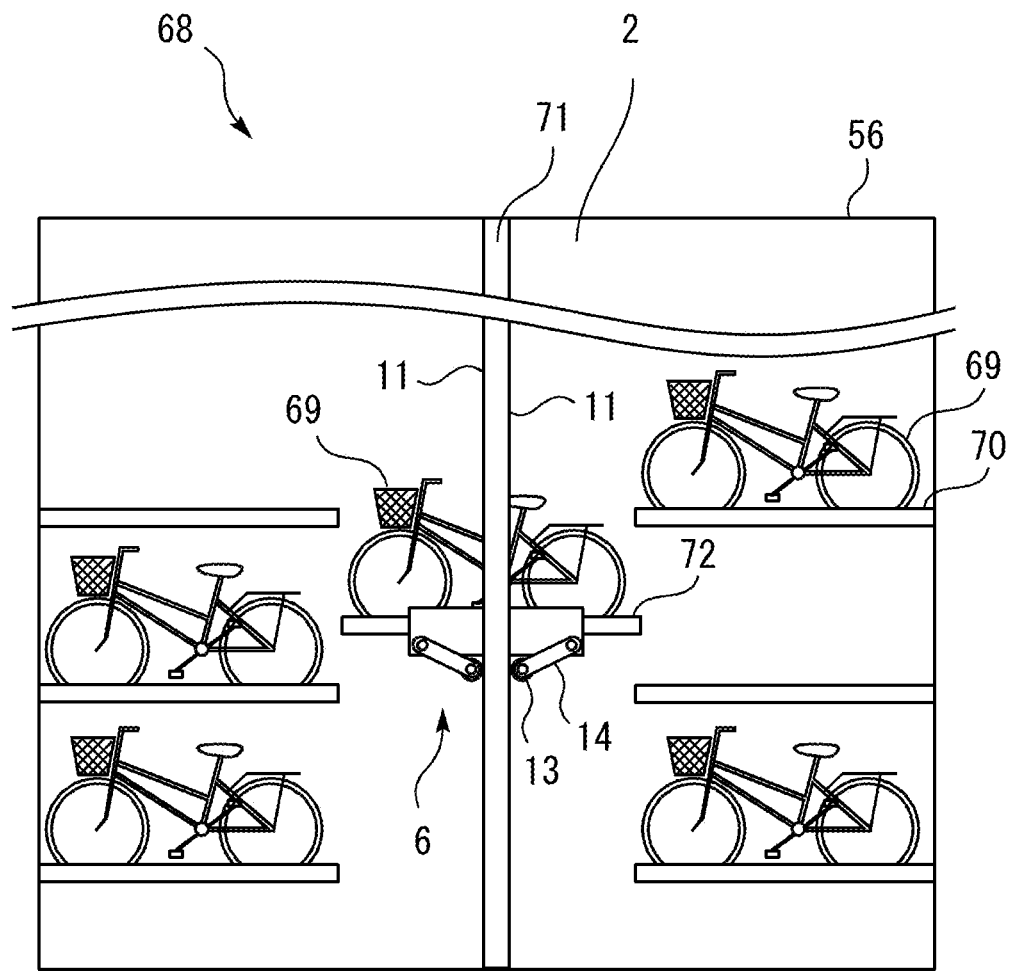
FIG. 35 A front view of a conveying device according to a twelfth embodiment.

FIG. 35 is a front view of a conveying device according to a twelfth embodiment.

In FIG. 35, a mechanical multistory bicycle parking device 68 is shown as an example of the conveying device. The multistory bicycle parking device 68 is a device that conveys an object to be conveyed in a lifting and lowering direction in a multistory bicycle parking space or the like. The object to be conveyed is, for example, a bicycle 69. In the multistory bicycle parking space in this example, a bicycle storage shelf 70 is provided. The bicycle 69 is stored in the bicycle storage shelf 70. In the multistory bicycle parking space, a strut 71 is provided. The strut 71 is a member extending in the lifting and lowering direction. The strut 71 is an example of the first rail or the second rail. The strut 71 includes the guide surface 11. The guide surface 11 is a surface extending in the longitudinal direction of the strut 71. In this example, the shaft 2 is an opened space extending in the lifting and lowering direction along the strut 71. In this example, the shaft 2 is not divided from a peripheral space.

The multistory bicycle parking device 68 includes a bicycle holding section 72 and the driving device 6.

The bicycle holding section 72 is a portion that holds a loaded bicycle 69. The bicycle holding section 72 supports the load of the bicycle 69. The bicycle holding section 72 is an example of the loading-weight supporting section. The bicycle holding section 72 includes a bicycle moving mechanism to be able to put the bicycle 69 to be loaded in and take the bicycle 69 out of the bicycle storage shelf 70.

The driving device 6 is provided in the bicycle holding section 72. The driving device 6 includes two links for self-boosting 14 and two wheel units 13. The links for self-boosting 14 and the wheel units 13 are symmetrically arranged on both sides across the strut 71. The links for self-boosting 14 are rotatably connected to the bicycle holding section 72 by the second connecting sections 18. The driving wheel 15 of one wheel unit 13 is in contact with, for example, the guide surface 11 of the strut 71. The driving wheel 15 of the other wheel unit 13 is in contact with, for example, the guide surface 11 on the opposite side of the strut 71.

Subsequently, an example of a motion of the multistory bicycle parking device 68 is explained.

The bicycle holding section 72 of the multistory bicycle parking device 68 is loaded with the bicycle 69, for example, on a floor surface. The driving device 6 drives to rotate the driving wheel 15 to thereby, for example, move the bicycle holding section 72 upward. The bicycle holding section 72 moves the bicycle 69 to the bicycle storage shelf 70 with a bicycle moving mechanism. In this way, the multistory bicycle parking device 68 stores the bicycle 69. Note that the multistory bicycle parking device 68 operates in the same manner when the bicycle 69 is taken out.

Any of the characteristics disclosed in the embodiments explained above may be applied to the multistory bicycle parking device 68. Any of the driving devices 6, the control section 7, and the like in the embodiments explained above may be applied to the multistory bicycle parking device 68. Consequently, the driving device 6 light in weight and having a simple configuration can be applied to the multistory bicycle parking device 68. The multistory bicycle parking device 68 can stably convey the bicycle 69 even when the center of gravity of the bicycle 69 deviates because of, for example, a difference of a size of the bicycle 69.

Note that the strut 71 is not limited to an example in which the strut 71 is arranged on one side of the bicycle 69 loaded on the bicycle holding section 72. The strut 71 may be arranged in front of or behind the bicycle 69 loaded on the bicycle holding section 72. The multistory bicycle parking device 68 may convey the bicycle 69 along two struts 71. The two struts 71 may be arranged on both sides of the bicycle 69 loaded on the bicycle holding section 72. The multistory bicycle parking device 68 may store, in the bicycle storage shelf 70 in a basement, the bicycle 69 loaded on the ground. At this time, the driving device 6 moves the bicycle holding section 72, in which the bicycle 69 is stored, downward to thereby convey the bicycle 69.

Thirteenth Embodiment

Figure 36:
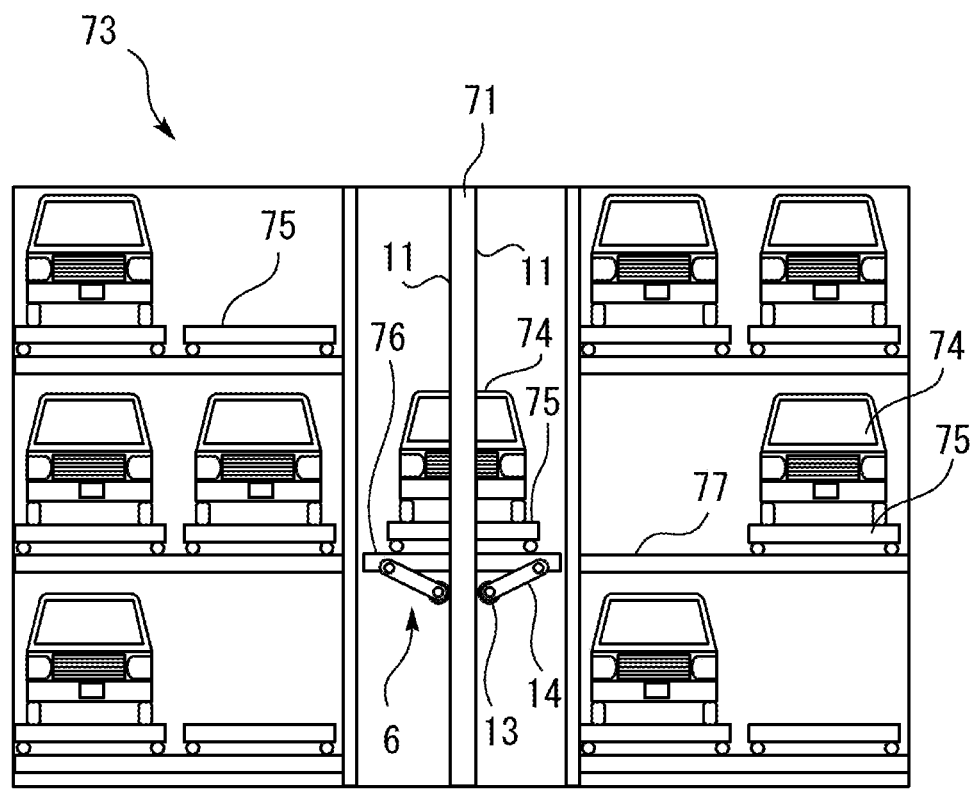
FIG. 36 A front view of a conveying device according to a thirteenth embodiment.

FIG. 36 is a front view of a conveying device according to a thirteenth embodiment.

In FIG. 36, a mechanical multistory parking device 73 is shown as an example of the conveying device. The multistory parking device 73 is a device that conveys an object to be conveyed in a lifting and lowering direction in a multistory parking space or the like. The object to be conveyed is, for example, an automobile 74. The multistory parking space includes a plurality of floors. In the multistory parking space, the strut 71 is provided. The strut 71 is a member extending in the lifting and lowering direction across the plurality of floors. The strut 71 is an example of the first rail or the second rail. The strut 71 includes the guide surface 11. The guide surface 11 is a surface extending in the longitudinal direction of the strut 71. In this example, the shaft 2 is a space extending in the lifting and lowering direction across the plurality of floors.

The multistory parking device 73 includes a horizontally moving base 75, a supporting section 76, and the driving device 6.

The horizontally moving base 75 is a device that is loaded with the automobile 74 and horizontally moves on a floor surface 77 of each of the plurality of floors of the multistory parking space. In the multistory parking space, the automobile 74 is stored on the horizontally moving base 75 that is standing still on the floor surface 77.

The supporting section 76 is a portion that holds the automobile 74 loaded on the horizontally moving base 75. The supporting section 76 supports the load of the horizontally moving base 75 and the loaded automobile 74. The supporting section 76 is an example of the loading-weight supporting section.

The driving device 6 is provided in the supporting section 76. The driving device 6 includes two links for self-boosting 14 and two wheel units 13. The links for self-boosting 14 and the wheel units 13 are symmetrically arranged on both sides across the strut 71. The links for self-boosting 14 are rotatably connected to the supporting section 76 by the second connecting section 18. The driving wheel 15 of one wheel unit 13 is in contact with, for example, the guide surface 11 of the strut 71. The driving wheel 15 of the other wheel unit 13 is in contact with, for example, the guide surface 11 on the opposite side of the strut 71.

Subsequently, an example of a motion of the multistory parking device 73 is explained.

In the multistory parking space, when the automobile 74 is loaded on the horizontally moving base 75, the height of the upper surface of the horizontally moving base 75 is aligned with, for example, the height of the floor surface 77 of an entrance floor of the multistory parking space. For example, the automobile 74 is moved from the floor surface 77 of the entrance floor onto the horizontally moving base 75 by, for example, a driver of the automobile 74. In this way, the automobile 74 is loaded on the horizontally moving base 75.

The horizontally moving base 75, on which the automobile 74 is loaded, horizontally moves to the upper surface of the supporting section 76 stopped in the entrance floor. Thereafter, the horizontally moving base 75 stands still on the supporting section 76.

The driving device 6 drives to rotate the driving wheel 15 to thereby move the supporting section 76, for example, upward. The driving device 6 moves the supporting section 76 such that the height of the floor surface 77 of a floor where the automobile 74 is stored and the height of the upper surface of the supporting section 76 coincide.

The horizontally moving base 75 horizontally moves from the upper surface of the supporting section 76 to the floor surface 77 of the floor where the automobile 74 is stored. Thereafter, the horizontally moving base 75 stands still in a position where the automobile 74 is stored in the floor. In this way, the multistory parking device 73 stores the automobile 74. Note that the multistory parking device 73 operates in the same manner when the automobile 74 is taken out.

Any of the characteristics disclosed in the embodiments explained above may be applied to the multistory parking device 73. Any of the driving devices 6, the control section 7, and the like in the embodiments explained above may be applied to the multistory parking device 73. Consequently, the driving device 6 light in weight and having a simple configuration can be applied to the multistory parking device 73. The multistory parking device 73 can stably convey the automobile 74 even when the center of gravity of the automobile 74 deviates because of, for example, a difference of a model or a stop position of the automobile 74.

INDUSTRIAL APPLICABILITY

The conveying device according to the present invention can be applied to conveyance of an object to be conveyed in a lifting and lowering direction.

REFERENCE SIGNS LIST

1 Elevator
2 Shaft
3 Rail
4 Car
5 Car cabin
6 Driving device
7 Control section
8 Car platform
9 Base plate
10 Guide plate
11 Guide surface
12 Base
13 Wheel unit
14 Link for self-boosting
15 Driving wheel
16 Motor
17 First connecting section
18 Second connecting section
19 Counter wheel
20 Sub-wheel
21 Wheel coupling section
22 Counter-wheel coupling section
23 Second sub-wheel
24 Parent coupling section
25 Child coupling section
26 Differential mechanism
27 Piston
28 Cylinder
29 Holding section
30 Channel
31 Movable section
32 Guide
33 Wire
34 Roller
35 Posture restraining mechanism
36 Auxiliary wheel
37 Posture restraining link
38 Posture restraining spring
39 Position restraining mechanism
40 Third connecting section
41 First link
42 Second link
43 First gear
44 Second gear
45 Return spring
46 Angle sensor
47 Wear detecting part
48 Informing part
49 Displacement meter
50 Load cell
51 Strain gauge
52 Posture sensor
53 Posture maintaining part
54 Distance sensor
55 Position tape
56 Distance sensor
57 Rotation sensor
58 Operation part
59 Stacker crane
60 Cargo
61 Shelf
62 Running rail
63 Frame
64 Mast
65 Fork
66 Cargo deck
67 Running device
68 Multistory bicycle parking device
69 Bicycle
70 Bicycle storage shelf
71 Strut
72 Bicycle holding section
73 Multistory parking device
74 Automobile
75 Horizontally moving base
76 Supporting section
77 Floor surface
7a Hardware
7b Processor
7c Memory

The invention claimed is:

1. A conveying device comprising:
a loading-weight support that supports a load of an object to be conveyed and moves up and down in a shaft to convey the object to be conveyed; and
a first driving device that is provided on the loading-weight support and lifts and lowers the loading-weight support along a first rail extending in a lifting and lowering direction of the loading-weight support in the shaft, wherein
the first driving device includes:
a first wheel unit including:
a first wheel in contact with a guide surface extending in a longitudinal direction of the first rail;

a sub-wheel that is arranged side by side with the first wheel in the lifting and lowering direction and is in contact with the guide surface; and a wheel coupling support that rotatably supports the first wheel, the first wheel unit driving to rotate the first wheel to lift and lower the loading-weight support; and a first coupling link including:

a first connecting joint connected to the first wheel unit; and a second connecting joint rotatably supported by the loading-weight support, wherein the second connecting joint is arranged in a position further apart from the guide surface than the first connecting joint, and the second connecting joint is arranged above the first connecting joint, wherein the first coupling link is arranged such that a tilt angle from a horizontal plane of a straight line connecting the first connecting joint and the second connecting joint is smaller than 45 degrees, and wherein the first wheel unit is rotatably connected to the first connecting joint of the first coupling link, independently of a second wheel which contacts with the first rail at a position on a side of the first rail, and the position is on an opposite side of the first rail where the first wheel contacts, in a state that the wheel coupling support rotatably supports the first wheel and the sub-wheel.

2. The conveying device according to claim 1, wherein the first driving device further includes:

a posture restraining mechanism including:

a first auxiliary wheel in contact with the guide surface;

a first posture restraining link having a first end connected to the first auxiliary wheel and second end connected to the loading-weight support; and a first posture restraining spring having a first end connected to the loading-weight support and a second end connected to the first posture restraining link, the first posture restraining spring maintaining, with an elastic force, the contact of the first auxiliary wheel with the guide surface.

3. The conveying device according to claim 2, wherein the first driving device includes:

a second wheel unit that is arranged symmetrically to the first wheel unit across the first rail and includes the second wheel; and a second coupling link that has a first end connected to the second wheel unit and a second end connected to the loading-weight support to be rotatably supported by the loading-weight support, the second coupling link being arranged symmetrically to the first coupling link across the first rail.

4. The conveying device according to claim 3, further comprising a rotation restraining transmitter assembly including:

two first links respectively coupled to the first coupling link and the second coupling link; and a second link connected to the loading-weight support and to the two first links, and the rotation restraining transmitter assembly causing the first wheel unit and second wheel unit to maintain a same tilt angle.

5. The conveying device according to claim 3, wherein the rotation restraining transmitter causes the first coupling link to rotate in a first direction and the second coupling link to rotate in a second direction opposite to the first direction.

6. The conveying device according to claim 3, further comprising:

a posture detector that detects a posture of the loading-weight support;

a second driving device that is provided on the loading-weight support and lifts and lowers the loading-weight support along a second rail extending in parallel to the first rail on an opposite side of the first rail across the loading-weight support; and processing circuitry that controls the first driving device and the second driving device, wherein the second driving device includes:

a third wheel unit including a third wheel, the third wheel being in contact with the second rail and driven to rotate based on the control by the processing circuitry; and a fourth wheel unit including a fourth wheel, the fourth wheel being in contact with the second rail, the fourth wheel unit being positioned symmetrical to the third wheel across the second rail, and driven to rotate based on the control by the processing circuitry, and the processing circuitry is configured to control the first driving device and the second driving device to rotate each of the first wheel, the second wheel, the third wheel, and the fourth wheel according to the posture detected by the posture detector to maintain the posture of the loading-weight support.

7. The conveying device according to claim 3, wherein the first driving device includes a second return spring having a first end connected to the first coupling link or the first wheel unit and a second end connected to the second coupling link or the second wheel unit, the second return spring maintaining, with an elastic force, contact of the first wheel with the guide surface.

8. The conveying device according to claim 1, wherein the first driving device includes a third return spring having a first end connected to the loading-weight support and a second end connected to the first coupling link, the third return spring maintaining, with an elastic force, contact of the first wheel with the guide surface.

9. The conveying device according to claim 8, wherein the first driving device includes a fourth posture return spring having a first end connected to the loading-weight support and a second end connected to the first wheel unit, the fourth return spring maintaining, with an elastic force, contact of the first wheel with the guide surface.

10. The conveying device according to claim 1, wherein the first driving device includes:

an angle detector that detects the tilt angle of the first coupling link; and processing circuitry to detect, based on the angle detected by the angle detector, that the first wheel is worn.

11. The conveying device according to claim 1, wherein the first driving device includes:

a pressing-force detector that detects a pressing force for pressing the first wheel against the guide surface; and processing circuitry to detect, based on the pressing force detected by the pressing-force detector, that the first wheel is worn.

12. The conveying device according to claim 10, further comprising:

a distance detector that measures a lifting and lowering distance of the loading-weight support; and a rotation detector that detects a rotation amount of the first wheel, wherein the processing circuitry is configured to:
calculate an estimated moving distance of the loading-weight support from an outer diameter of the first wheel based on a wear amount detected by the processing circuitry and the rotation amount detected by the rotation detector, and compare the estimated moving distance and a distance detected by the distance detector to estimate a slip amount of the first wheel.

13. A conveying device comprising:

a loading-weight support that supports a load of an object to be conveyed and moves up and down in a shaft to convey the object to be conveyed; and a first driving device that is provided on the loading-weight support, lifts and lowers the loading-weight support along a first rail extending in a lifting and lowering direction of the loading-weight support in the shaft, and includes:
  a first wheel unit including a first wheel in contact with a guide surface extending in a longitudinal direction of the first rail and drives to rotate the first wheel to lift and lower the loading-weight support;
  a second wheel unit that is arranged symmetrically to the first wheel unit across the first rail and includes a second wheel in contact with an opposite side of a position of the first rail where the first wheel is in contact;
  a first coupling link including:
    a first connecting joint connected to the first wheel unit; and
    a second connecting joint rotatably supported by the loading-weight support and positioned further apart from the guide surface than the first connecting joint, wherein the second connecting joint is arranged above the first connecting joint, and a tilt angle from a horizontal plane of a straight line connecting the first connecting joint and the second connecting joint is smaller than 45 degrees; and
  a second coupling link that is connected to the second wheel unit, rotatably supported by the loading-weight support, and arranged symmetrically to the first coupling link across the first rail; and
  a rotation restraining transmitter assembly that transmits, to the second coupling link, rotation generated in the first coupling link by displacement in a horizontal direction of the first wheel unit to displace the second wheel unit in an opposite direction of the first wheel unit.

14. A conveying device comprising:

a loading-weight support that supports a load of an object to be conveyed and moves up and down in a shaft to convey the object to be conveyed; and a first driving device that is provided on the loading-weight support, lifts and lowers the loading-weight support along a first rail extending in a lifting and lowering direction of the loading-weight support in the shaft, and includes:
  a first wheel unit that includes a first wheel in contact with a guide surface extending in a longitudinal direction of the first rail and drives to rotate the first wheel to lift and lower the loading-weight support;
  a second wheel unit that is arranged symmetrically to the first wheel unit across the first rail and includes a second wheel in contact with a rear side of a position of the first rail where the first wheel is in contact;
  a first coupling link including:
    a first connecting joint connected to the first wheel unit; and
    a second connecting joint rotatably supported by the loading-weight support and positioned further apart from the guide surface than the first connecting joint, wherein the second connecting joint is arranged above the first connecting joint, and a tilt angle from a horizontal plane of a straight line connecting the first connecting joint and the second connecting joint is smaller than 45 degrees; and
  a second coupling link that is connected to the second wheel unit, rotatably supported by the loading-weight support, and arranged symmetrically to the first coupling link across the first rail; and
  a rotation restraining transmitter assembly that transmits, to the first coupling link, rotation generated in the second coupling link by displacement in a horizontal direction of the second wheel unit to displace the first wheel unit in an opposite direction of the second wheel unit.

\* \* \* \* \*